US011351978B2

(12) United States Patent
Uyeki

(10) Patent No.: US 11,351,978 B2
(45) Date of Patent: Jun. 7, 2022

(54) SYSTEM AND METHOD FOR ACTUATING A VEHICLE OPERATION POWER MODE

(71) Applicant: Honda Motor Co., Ltd., Tokyo (JP)

(72) Inventor: Robert Uyeki, Torrance, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 292 days.

(21) Appl. No.: 16/414,973

(22) Filed: May 17, 2019

(65) Prior Publication Data

US 2020/0361440 A1 Nov. 19, 2020

(51) Int. Cl.
*B60L 9/00* (2019.01)
*B60L 11/00* (2006.01)
*G05D 1/00* (2006.01)
*G05D 3/00* (2006.01)
*G06F 7/00* (2006.01)
*G06F 17/00* (2019.01)
*B60W 20/00* (2016.01)
*B60K 6/22* (2007.10)

(52) U.S. Cl.
CPC ............. *B60W 20/00* (2013.01); *B60K 6/22* (2013.01); *B60W 2530/00* (2013.01); *B60W 2530/18* (2013.01); *B60W 2710/244* (2013.01); *B60Y 2200/92* (2013.01)

(58) Field of Classification Search
CPC ............. B60W 20/00; B60W 2530/00; B60W 2530/18; B60W 2710/244; B60K 6/22; B60Y 2200/92
USPC .......................................................... 701/22
See application file for complete search history.

(56) References Cited

U.S. PATENT DOCUMENTS

| 8,190,319 | B2 | 5/2012 | Syed et al. |
| 8,346,603 | B2 | 1/2013 | Sakakibara et al. |
| 8,812,224 | B1 | 8/2014 | Heitmann |
| 9,073,554 | B2 | 7/2015 | Hyde et al. |
| 9,079,505 | B1 | 7/2015 | Hyde et al. |
| 9,283,954 | B2 | 3/2016 | Dalum |
| 2007/0203722 | A1 | 8/2007 | Richards et al. |
| 2007/0250329 | A1 | 10/2007 | Richards et al. |
| 2008/0154691 | A1* | 6/2008 | Wellman ............... G05D 1/0297 705/7.26 |
| 2010/0228415 | A1 | 3/2010 | Paul |
| 2011/0251750 | A1 | 10/2011 | Fields et al. |
| 2011/0301997 | A1 | 12/2011 | Gale et al. |
| 2012/0303397 | A1* | 11/2012 | Prosser .................... B60L 53/00 705/7.12 |
| 2018/0056982 | A1* | 3/2018 | Endo ...................... B60W 10/18 |

(Continued)

FOREIGN PATENT DOCUMENTS

CN 106143481 4/2014

*Primary Examiner* — Mahmoud S Ismail
(74) *Attorney, Agent, or Firm* — Rankin, Hill & Clark LLP

(57) ABSTRACT

A system and method for actuating a vehicle operation power mode that include receiving sensor data from at least one sensor of a vehicle. The system and method also include determining if at least one vehicle operation requirement is met based on analysis of the sensor data and actuating an electric powered operation mode of the vehicle based on determining that the at least one operation requirement is met. The system and method further include controlling the vehicle to be powered by electrical power supplied by an electric battery of the vehicle based on the actuation of the electric powered operation mode.

18 Claims, 6 Drawing Sheets

(56) References Cited

U.S. PATENT DOCUMENTS

| | | | |
|---|---|---|---|
| 2019/0196503 A1* | 6/2019 | Abari | G06Q 10/00 |
| 2020/0058044 A1* | 2/2020 | Deng | H04W 4/40 |
| 2020/0104965 A1* | 4/2020 | Ramot | G06Q 30/0621 |

* cited by examiner

SYSTEM AND METHOD FOR ACTUATING A VEHICLE OPERATION POWER MODE

Many areas are implementing or starting to implement zero emission vehicle programs that may require or incentive automobile manufactures to sell and/or promote the use of electric vehicles. In some cases, automobile manufactures may be required to maintain a certain number of ZEV credits based on government regulatory agency requirements. These programs may assign ZEV credits to automobile manufactures that may be influenced by the sale of electric vehicles and/or the utilization of electric power to operate the electric vehicles.

In many cases, the ZEV credit requirements are increasing and may continue to increase as certain areas are promoting clean energy programs. In many cases, to fulfill their requirements, automobile manufactures purchase extra ZEV credits from other manufacturers. In some markets/regions consumers may not be purchasing and/or leasing high volumes of fully electric vehicles based on various factors. Accordingly, automobile manufactures may be finding it difficult to accumulate a requisite amount of ZEV credits without purchasing extra ZEV credits from other automakers.

BRIEF DESCRIPTION

According to one aspect, a computer-implemented method for actuating a vehicle operation power mode that includes receiving sensor data from at least one sensor of a vehicle. The computer-implemented method also includes determining if at least one vehicle operation requirement is met based on analysis of the sensor data and actuating an electric powered operation mode of the vehicle based on determining that the at least one operation requirement is met. The computer-implemented method further includes controlling the vehicle to be powered by electrical power supplied by an electric battery of the vehicle based on the actuation of the electric powered operation mode.

According to another aspect, a system for actuating a vehicle operation power mode that includes a memory storing instructions when executed by a processor cause the processor to receive sensor data from at least one sensor of a vehicle. The instructions also cause the processor to determine if at least one vehicle operation requirement is met based on analysis of the sensor data and actuate an electric powered operation mode of the vehicle based on determining that the at least one operation requirement is met. The instructions further cause the processor to control the vehicle to be powered by electrical power supplied by an electric battery of the vehicle based on the actuation of the electric powered operation mode.

According to still another aspect, a non-transitory computer readable storage medium storing instructions that when executed by a computer, which includes a processor perform a method, the method includes receiving sensor data from at least one sensor of a vehicle. The method also includes determining if at least one vehicle operation requirement is met based on analysis of the sensor data and actuating an electric powered operation mode of the vehicle based on determining that the at least one operation requirement is met. The method further includes controlling the vehicle to be powered by electrical power supplied by an electric battery of the vehicle based on the actuation of the electric powered operation mode.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
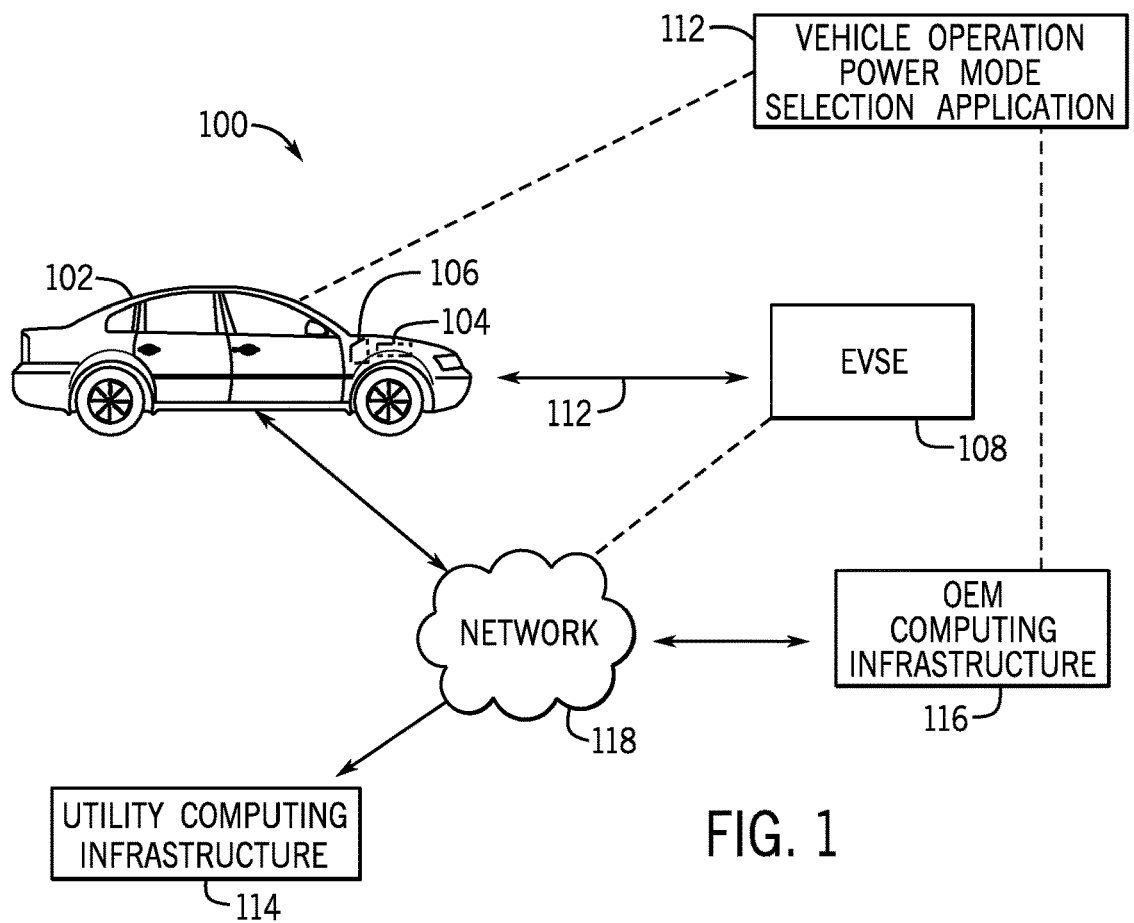
FIG. 1 is a schematic view of an exemplary operating environment for actuating a vehicle operation power mode according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus,' as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Media Oriented System Transport (MOST), Local Interconnect Network (LIN), among others.

"Computer communication," as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

An "input device," as used herein may include devices for controlling different vehicle features which include various vehicle components, systems, and subsystems. The term "input device" includes, but it not limited to: push buttons, rotary knobs, and the like. The term "input device" additionally includes graphical input controls that take place within a user interface which may be displayed by various types of mechanisms such as software and hardware based controls, interfaces, or plug and play devices.

A "memory," as used herein may include volatile memory and/or nonvolatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

A "module," as used herein, includes, but is not limited to, hardware, firmware, software in execution on a machine, and/or combinations of each to perform a function(s) or an action(s), and/or to cause a function or action from another module, method, and/or system. A module may include a software controlled microprocessor, a discrete logic circuit, an analog circuit, a digital circuit, a programmed logic device, a memory device containing executing instructions, and so on.

An "operable connection," as used herein may include a connection by which entities are "operably connected", is one in which signals, physical communications, and/or logical communications may be sent and/or received. An operable connection may include a physical interface, a data interface and/or an electrical interface.

An "output device," as used herein may include devices that may derive from vehicle components, systems, subsystems, and electronic devices. The term "output devices" includes, but is not limited to: display devices, and other devices for outputting information and functions.

A "processor," as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle," as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

An "electric vehicle" (EV), as used herein, refers to any moving vehicle that is capable of carrying one or more human occupants and is powered entirely or partially by one or more electric motors powered by an electric battery. The EV may include battery electric vehicles (BEVs), plug-in hybrid electric vehicles (PHEVs) and extended range electric vehicles (EREVs). The term "vehicle" includes, but is not limited to: cars, trucks, vans, minivans, SUVs, motorcycles, scooters, boats, personal watercraft, and aircraft.

A "vehicle system," as used herein may include, but are not limited to, any automatic or manual systems that may be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1 is a schematic view of an exemplary operating environment 100 for actuating a vehicle operation power mode according to an exemplary embodiment of the present disclosure. As shown, the operating environment 100 may include one or more vehicles 102 that may configured as a plug-in hybrid vehicles (PHEVs) and/or battery electric vehicles (BEVs) that may operate in a fuel powered operation mode and/or an electric powered operation mode. In one embodiment, the vehicle(s) 102 may be operated through a conventional fuel powered engine 104 (engine) during actuation of the fuel powered operation mode. In one configuration, the engine 104 may be configured as an internal combustion engine which is configured to combust gasoline fuel. During actuation of the fuel powered operation mode, the vehicle(s) 102 may be configured to be operated based on motive power supplied by the engine 104 of the vehicle(s) 102.

The vehicle(s) 102 may alternatively be operated through a motor (not shown) that is powered by an electric powered battery (battery) 106 during actuation of the electric powered operation mode. The battery 106 may be configured to include one or more battery cells that may be configured to be recharged based on electricity provided by one or more charging sources, as discussed below. Accordingly, during actuation of the electric powered operation mode, the vehicle(s) 102 may be configured to be operated based on electrical power supplied by the battery 106 of the vehicle(s) 102.

In some configurations, the vehicle(s) 102 may be partially powered by the engine 104 and partially powered by the battery 106 such that during a trip the vehicle(s) 102 may be operated based on fuel power during actuation of the fuel powered operational mode and the vehicle(s) 102 and may be operated on electric power during actuation of the electric powered operation mode. It is to be appreciated that the vehicle(s) 102 may be configured with additional or alternate types of power sources and power operational modes. For example, the vehicle(s) 102 may be configured as a hydrogen-electric vehicle or a hydrogen-fuel vehicle that may be configured to provide hydrogen power from a fuel cell (not shown) of the vehicle(s) 102.

In one configuration, the battery 106 may be recharged through one or more electric sources that may be tied to an electric grid. For example, the battery 106 may be recharged by an electric vehicle supply equipment (EVSE) 108 based on a connection to a charging link 110 between the EVSE 108 and the vehicle(s) 102. In some configurations, the engine 104 may operate to provide charging power to the battery 106 during operation of the engine 104 such that when the engine 104 provides motive power to operate the vehicle(s) 102, the battery 106 may be provided with an electrical charge to recharge the battery 106. In some cases, the engine 104 may be configured to charge the battery 106 when the vehicle(s) 102 is stopped and/or one or more occupants may be entering or exiting the vehicle(s) 102.

In one or more cases, the engine 104 may be configured to charge the battery 106 when the vehicle(s) 102 is determined not to include any non-driving occupants (e.g., only the driver of the vehicle 102 is occupying the vehicle 102). The battery 106 may further be utilized to provide electrical power to operate the vehicle(s) 102 when one or more non-driving occupants are determined to enter the vehicle(s) 102. In additional configurations, one or more additional sources of energy may be utilized to provide charging power to the battery 106. For example, in some configurations, regenerative braking may be utilized to provide an electric charge to recharge the battery 106.

Figure 2:
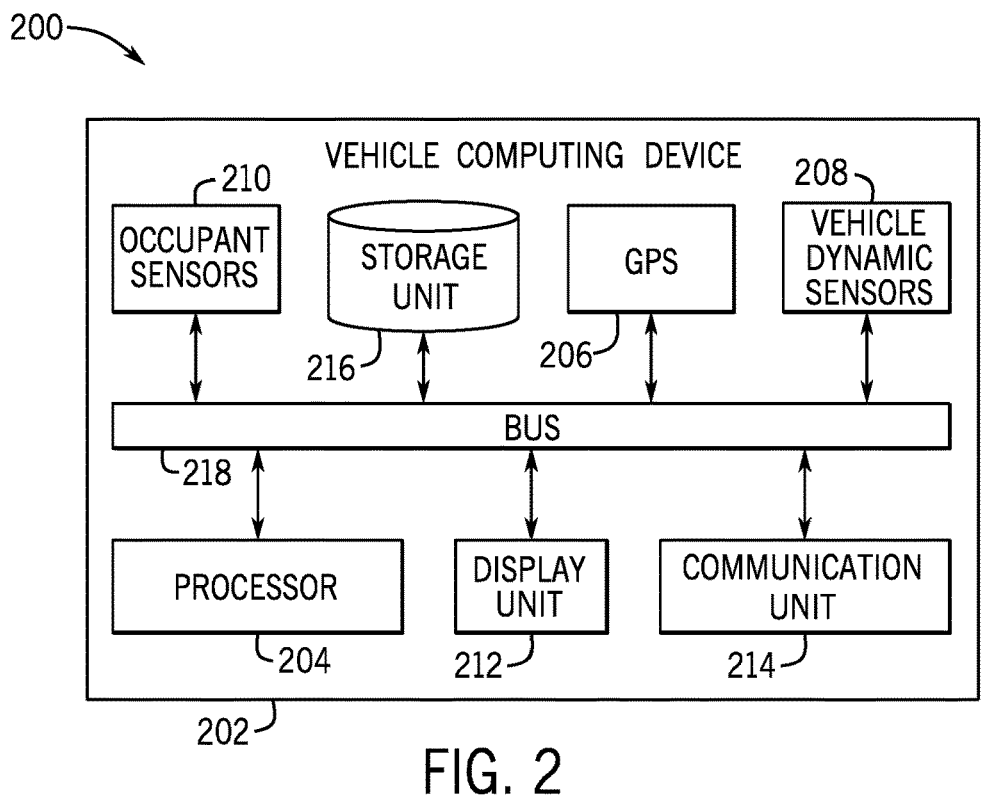
FIG. 2 is a schematic view of an illustrative vehicle architecture according to an exemplary embodiment of the present disclosure.

With continued reference to FIG. 1 and with reference to FIG. 2, a schematic view of an illustrative vehicle architecture 200 according to an exemplary embodiment of the present disclosure, the vehicle(s) 102 may include a vehicle computing device 202 that may be configured to operably control the components of the vehicle(s) 102. In an exemplary embodiment, the vehicle computing device 202 may be configured to execute one or more applications that may be stored on a storage unit 216 of the vehicle(s) 102. The vehicle computing device 202 may be configured to execute a vehicle operation power mode selection application (power mode selection application) 112 that may be utilized to selectively actuate the electric powered operation mode of the vehicle(s) 102 and/or the fuel powered operation mode of the vehicle(s) 102. In one or more configurations, the power mode selection application 112 may be configured to maximize the actuation of the electric powered mode of the vehicle(s) 102 such that the vehicle(s) 102 may be operated through electric power for a maximum duration of time and/or distance of travel.

As discussed in more details below, the application 112 may be configured to selectively actuate the electric powered operation mode of the vehicle(s) 102 and/or the fuel powered operation mode of the vehicle(s) 102 based on a determination if one or more vehicle operational requirements are met. In other words, the power mode selection application 112 may determine if one or more vehicle operational requirements are met to thereby change the mode of power to operate the vehicle(s) 102 between the fuel powered operation mode and the electric powered operation mode.

It is to be appreciated that the power mode selection application 112 may utilize one or more additional power sources in addition to or in lieu of electrical power and/or fuel power. For example, in an alternate embodiment, the application 112 may also provide a hydrogen powered operation mode of the vehicle(s) 102 that may be actuated to provide hydrogen power based on the determination of one or more vehicle operational requirements being met. However, for purposes of simplicity the present disclosure will mainly discuss the actuation of the electric powered operation mode or the fuel powered operation mode.

In one embodiment, the power mode selection application 112 may additionally be utilized by an automobile manufacturer (OEM) (not shown) to manage leasing of the vehicle(s) 102 to thereby promote maximum utilization of electrical power by one or more vehicle operators (e.g., customers, individuals, ride share providers). The OEM may manage a leasing program and may implement one or more lease payment rates that may be determined by the application 112 and billed to one or more vehicle operators. The one or more lease payment rates may be based on various factors, including, but not limited to, a type of vehicle (e.g., model of the vehicle), a power operation type of the vehicle (e.g., electric vehicle, gas fueled vehicle, battery electric vehicle, plug-in hybrid electric vehicles, etc.), a number of occupants that may be occupying the vehicle(s) 102 for one or more periods of time, a duration of time the electric powered operation mode is actuated for the vehicle(s) 102, a distance of travel that the electric powered operation mode is actuated for the vehicle(s) 102, and/or a cost of energy at one or more geo-locations in which the vehicle(s) 102 is traveling. In one configuration, the power mode selection application 112 may be configured to determine one or more lease payment rates for one or more lease periods (e.g., day, week, month) that may be charged to the vehicle operator(s) for leasing the vehicle(s) 102 that may be based on the aforementioned factors.

In particular, the application 112 may be configured to determine one or more discounts to a standard lease payment rate that may be predetermined by the OEM (e.g., discounted from a standard lease rate for fuel vehicles) that may be based on a duration a time and/or distance traveled by the vehicle(s) 102 when the application 112 actuates the electric powered operation mode of the vehicle(s) 102. The lease payment rate(s) that may be charged to the vehicle operator(s) may also be based on a cost of energy at one or more geo-locations where the vehicle(s) 102 is traveling. As discussed below, the cost of energy at the one or more geo-locations where the vehicle(s) 102 is traveling may be based on data provided by one or more utility providers through a utility computing infrastructure 114, as discussed below.

In one embodiment, the application 112 may additionally be configured to be utilized by the OEM and/or a ride share provider to manage dispatch of one or more vehicles 102 for one or more periods of time to be utilized for leasing and/or ride sharing programs. The application 112 may provide a human machine interface (HMI) to the OEM and/or ride share provider that may be utilized to select and provide one or more vehicles 102 that may be dispatched for leasing and/or ride sharing programs.

In one or more embodiments, the power mode selection application 112 may also be utilized by the OEM to maximize and determine a number of zero-emission vehicle program credits (ZEV credits) that may be provided to the OEM to manage the operation of the vehicle(s) 102 and to promote cleaner energy utilization of the vehicle(s) 102. The power mode selection application 112 may be configured to determine the number of ZEV credits that may be provided to the OEM that may be based on the duration of time and/or a distance of travel that the one or more vehicles 102 that are sold and/or leased by the OEM operate using electric power upon actuation of the electric powered operation mode.

In one embodiment, the actuation of the electric powered operation mode may be based on meeting a vehicle operational requirement that pertains to a number of occupants that are seated within the vehicle(s) 102 as its being operated. The application 112 may utilize an occupant threshold (value) that may be tied to a number of occupants that may be occupying the vehicle(s) 102 that may indicate that ride sharing/carpooling is occurring. In some configurations, a value (e.g., number) of the occupant threshold may be based on one or more external factors that include, but may not be limited to, a population of a particular region (e.g., city population), the model of the vehicle(s) 102 (e.g., two seater vehicle(s), four seater vehicle(s)), the time of day/week/month that the vehicle(s) 102 is being operated, and the like.

In one embodiment, the power mode selection application 112 may be configured to actuate the electric powered operation mode of the vehicle(s) 102 such that the vehicle(s) 102 is operated based on electrical power supplied by the battery 106 of the vehicle(s) 102 when a number of occupants that are sensed to be occupying the vehicle(s) 102 are determined to be above the occupant threshold. In other words, if a number of occupants that are seated within the vehicle(s) 102 are above the occupant threshold, the application 112 may be configured to actuate the electric powered operation mode of the vehicle(s) 102 at one or more durations which may thereby provide a discounted lease rate(s) to be charged to the vehicle operator(s). Accordingly, the power mode selection application 112 may be configured to maximize a number of occupants of the vehicle(s) 102 and thereby maximize the duration and/or the distance that the vehicle(s) 102 are operated within the electric powered operation mode to thereby maximize the number of ZEV credits that may be provided to the OEM.

Alternatively, if the number of occupants that are seated within the vehicle(s) 102 are below the occupant threshold, the power mode selection application 112 may be configured to actuate the fuel powered operation mode of the vehicle(s) 102 at one or more durations which may thereby provide a standard lease rate(s) (e.g., non-discounted lease rate) to be charged to the vehicle operator(s). Accordingly, the application 112 may function to promote ride sharing and/or utilization of the vehicle(s) 102 at one or more low traffic periods (e.g., low energy demand periods) by thereby providing discounted lease rate amounts to the vehicle operator(s) based on the duration of time that the vehicle(s) 102 is operating and/or distance that the vehicle(s) 102 is operating in the electric powered operation mode. In other words, the power mode selection application 112 promotes higher utilization of electricity to operate the vehicle(s) 102 to thereby reduce the lease rate(s) for the vehicle operator(s) while increasing the number of ZEV credits for the OEM.

In some embodiments, the application 112 may facilitate and promote ride sharing by providing one or more interfaces to the vehicle operator(s) that participate in ride sharing programs to allow various ride sharing customers in a particular geo-location to utilize the vehicle(s) 102 to increase the number of occupants to meet or surpass the occupant threshold. This functionality may thereby allow the vehicle operator(s) to pass on savings to their ride sharing customers that are derived based on receiving the discounted lease rate(s) for utilizing the electric powered operation mode of the vehicle(s) 102 for a longer duration and/or for a longer distance. For example, the application 112 may provide one or more interfaces that may be used by the vehicle operator(s) to allow ride sharing customers that are located within a certain predetermined vicinity of one another to utilize a particular vehicle(s) 102 to reach their intended destinations. This functionality may thereby increase the number of occupants within the vehicle(s) 102 to meet or surpass the occupant threshold to maximize a duration and/or a distance of actuation of the electric powered operation mode of the vehicle(s) 102. Accordingly, the power mode selection application 112 may calculate discounted lease rate(s) for the vehicle operator(s) who may pass on savings to the driver and/or one or more non-driving passengers of the vehicle(s) 102.

Additionally, as discussed above, the application 112 may additionally be utilized by the OEM and/or a ride share provider to manage dispatch of one or more vehicles 102 for one or more periods of time to be utilized for leasing and/or ride sharing programs. The application 112 may accordingly provide one or more user interfaces that may be utilized to select and provide particular vehicles 102 that may be dispatched for leasing and/or ride sharing programs.

In one configuration, the application may manage dispatch of the vehicle(s) 102 based on a state of charge of the battery 106 of the vehicle(s) 102 and/or a geo-location of the vehicle(s) 102. In particular, the application 112 may be configured to determine a geo-location of the vehicle(s) 102 based on communication with a GPS (shown in FIG. 2) and may also communicate with the battery 106 of the vehicle(s) 102 to determine a state of charge that may allow the vehicle(s) 102 to be operated for a maximum duration and/or distance in the electric powered operation mode based on meeting one or more vehicle operational requirements. Accordingly, the application 112 may dispatch a particular vehicle 102 that may maximize utilization of the electric powered operation mode which may influence the lease payment rate(s) that may be charged to the vehicle operator(s) and the number of ZEV credits that may be provided to the OEM.

In another configuration, the application 112 may be configured to receive expected trip destination information (e.g., a point of interest, a destination address) from a user (e.g., ride-sharing customer, driver), the vehicle operator, the OEM, and/or a ride share provider. The application 112 may thereby communicate with the battery 106 of the one or more vehicles 102 to determine if the battery 106 includes a requisite state of charge that may allow the vehicle(s) 102 to be operated to reach the expected destination from a present geo-location(s) of the vehicle(s) 102 with maximum utilization of the electric powered operation mode. Accordingly, the application 112 may dispatch a particular vehicle 102 that may maximize utilization of the electric powered operation mode which may influence the lease payment rate(s) that may be charged to the vehicle operator(s) and the number of ZEV credits that may be provided to the OEM.

In some embodiments, the application 112 may calculate if a fleet of managed vehicles that may be dispatched may be utilized to influence the number of ZEV credits that may be provided to the OEM based on the electric powered utilization of the fleet. The application 112 may thereby be configured to dispatch one or more vehicles 102 of the fleet based on respective states of charge of respective batteries 106 to maximize utilization of the electric powered operation mode of all of the vehicles 102 of the fleet to thereby maximize the number of ZEV credits that may be provided to the OEM.

As discussed below, in an additional embodiment, the actuation of the electric powered operation mode may be based on meeting a vehicle operational requirement that pertains to a speed threshold (value). The speed threshold may related to a predetermined speed (e.g., value) that the vehicle(s) 102 is to be traveling below to allow the vehicle(s) 102 to be operated by electrical power. The application 112 may be configured to actuate the electric powered operation mode of the vehicle(s) 102 such that the vehicle(s) 102 is operated based on electrical power supplied by the battery 106 of the vehicle(s) 102 when a sensed real-time speed of the vehicle(s) 102 is determined to be below the speed threshold. In other words, if the real-time speed of the vehicle(s) 102 (e.g., 35 MPH) is below the speed threshold (e.g., 40 MPH), the application 112 may be configured to actuate the electric powered operation mode of the vehicle(s) 102 at one or more durations and for one or more distances during which the speed is below the speed threshold. This functionality may thereby provide a discounted lease rate(s) to be charged to the vehicle operator(s).

Alternatively, if the speed of the vehicle(s) 102 meets or surpasses the speed threshold, the application 112 may be configured to actuate the fuel powered operation mode of the vehicle(s) 102 at one or more durations and for one or more distances during which the speed is above the speed threshold which may thereby provide a standard lease rate(s) (e.g., non-discounted lease rate) to be charged to the vehicle operator(s). Accordingly, the application 112 may function to promote energy efficient driving of the vehicle(s) 102 and/or utilization of the vehicle(s) 102 at one or more low traffic periods (e.g., low energy demand periods) by thereby providing discounted lease rate amounts to the vehicle operator(s) while increasing the number of ZEV credits for the OEM.

In another embodiment, the actuation of the electric powered operation mode may be based on meeting a vehicle operational requirement that pertains to a throttle position threshold (value). The throttle position threshold may be related to a predetermined throttle position (e.g., value) that a vehicle throttle body (not shown) of the vehicle(s) 102 is to be below to allow the vehicle(s) 102 to be operated by electric powered operation mode. The application 112 may be configured to actuate the electric powered operation mode of the vehicle(s) 102 such that the vehicle(s) 102 is operated based on electrical power supplied by the battery 106 of the vehicle(s) 102 when the sensed real-time throttle position of the vehicle(s) 102 is determined to be below the throttle position threshold.

Stated differently, if the real-time throttle position of a throttle body of the engine 104 of the vehicle(s) 102 is below the throttle position threshold, the application 112 may be configured to actuate the electric powered operation mode of the vehicle(s) 102 at one or more durations and at one or more distances during which the real-time throttle position is below the throttle position threshold which may thereby provide a discounted lease rate(s) to be charged to the vehicle operator(s). Alternatively, if the sensed throttle position of the throttle body of the engine 104 of the vehicle(s) 102 meets or surpasses the throttle position threshold, the application 112 may be configured to actuate the fuel powered operation mode of the vehicle(s) 102 at one or more durations and at one or more distances during which the real-time throttle position is above the throttle position threshold which may thereby provide a standard lease rate(s) (e.g., non-discounted lease rate) to be charged to the vehicle operator(s). Accordingly, the application 112 may function to promote energy efficient driving of the vehicle(s) 102 and/or utilization of the vehicle(s) 102 at one or more low traffic periods (e.g., low energy demand periods) by thereby providing discounted lease rate amounts to the vehicle operator(s) while increasing the number of ZEV credits for the OEM.

With continued reference to FIG. 1 and FIG. 2, the vehicle computing device 202 may be configured with provisions for processing, communicating and interacting with various components of the vehicle(s) 102 and other components of the environment 100. The vehicle computing device 202 may include a processor 204, a position determination device 206 (GPS), a plurality of vehicle dynamic sensors 208, a plurality of occupant sensors 210, a display unit 212, a communication unit 214, and the storage unit 216. The components of the architecture 200, including the vehicle computing device 202, may be operably connected for computer communication via a bus 218 (e.g., a Controller Area Network (CAN) or a Local Interconnect Network (LIN) protocol bus) and/or other wired and wireless technologies. The vehicle computing device 202 as well as the vehicle(s) 102 may include other components and systems not shown.

In one embodiment, the storage unit 216 of the vehicle(s) 102 may store application data that may also include data pertaining to the power mode selection application 112. The GPS 206 of the vehicle(s) 102 may provide a real-time geo-location(s) of the vehicle(s) 102. In particular, the GPS 206 may communicate GPS/DGPS coordinates of the vehicle(s) 102 to the processor 204 and/or the power mode selection application 112. The geo-location(s) of the vehicle(s) 102 may be utilized by the power mode selection application 112 to determine an energy cost that may be provided by one or more utility providers during the particular point(s) in time at the particular geo-location(s) in which the vehicle(s) 102 is traveling.

The geo-location(s) of the vehicle(s) 102 may also be utilized by the application 112 to facilitate and promote ride sharing by providing the one or more interfaces to the vehicle operator(s)/ride share providers that participate in ride sharing programs to allow various ride sharing customers in a particular geo-location(s) to utilize the vehicle(s) 102 to increase the number of occupants to meet or surpass the occupant threshold. The application 112 may provide one or more interfaces that may be used by the vehicle operator(s) to allow ride sharing customers that are located within a certain predetermined vicinity of one another to utilize a particular vehicle(s) 102 based on its determined geo-location(s) as provided by the GPS 206 to reach their intended destinations. This functionality may thereby increase the number of occupants within the vehicle(s) 102 to meet or surpass the occupant threshold to maximize a duration and/or a distance of actuation of the electric powered operation mode of the vehicle(s) 102.

In one or more embodiments, the vehicle dynamic sensors 208 may be configured to sense vehicle dynamic parameters associated with the operation of the vehicle(s) 102. The vehicle dynamic sensors 208 may include, but may not be limited to, speed sensors, throttle position sensors, steering angle sensors, accelerator pedal sensors, brake sensors, wheel sensors, camshaft sensors, parking sensors, among others. As discussed below, the vehicle dynamic sensors 208 may be configured to provide real-time vehicle dynamic data based on sensed real-time dynamic measures to the power mode selection application 112.

The power mode selection application 112 may be configured to analyze the vehicle dynamic data provided by the vehicle dynamic sensors 208 to determine the real-time speed of the vehicle(s) 102 and/or the real-time throttle position of the throttle body of the engine 104 of the vehicle(s) 102 at a particular point in time. As discussed, the real-time speed and/or real-time throttle position may be analyzed by the application 112 to determine if one or more vehicle operational requirements are met or not met to thereby actuate the electric powered operation mode of the vehicle(s) 102 or the fuel powered operation mode of the vehicle(s) 102.

In an exemplary embodiment, the occupant sensors 210 of the vehicle(s) 102 may be configured to determine the number of occupants that are seated within the vehicle(s) 102 as it is being operated (e.g., driven). In one embodiment, the occupant sensors 210 may be configured as one or more camera sensors and/or radar sensors (both not shown) that may be disposed within one or more internal portions of the vehicle(s) 102. The one or more camera sensors and/or radar sensors may include respective processors (not shown) that may be configured to execute respective image logic and/or radar logic that may be analyzed to determine if an occupant is seated within each of the seats (not shown). In another embodiment, the occupant sensors 210 may be configured as seat sensors (not shown) that may disposed within the seats of the vehicle(s) 102. The seat sensors may be configured as capacitive touch sensors and/or weight sensors and may include respective processors (not shown) that may be configured to execute respective weight sensor logic and/or touch sensor logic that may be analyzed to determine if an occupant is seated within each of the seats.

As discussed below, the occupant sensors 210 may be configured to output and communicate occupant data to the power mode selection application 112 at each instance that there is a sensed change in the number of occupants that are occupying the vehicle(s) 102. In other words, upon sensing a change in the number of occupants based on one or more occupants entering the vehicle(s) 102 or exiting the vehicle(s) 102, the occupant sensors 210 may be configured to communicate occupant data to the power mode selection application 112. The power mode selection application 112 may be configured to analyze the occupant data provided by the occupant sensors 210 to determine the number of occupants seated within the vehicle(s) 102 after a change in the number of occupants is sensed. As discussed, the number of occupants may be analyzed by the application 112 to determine if one or more vehicle operational requirements are met or not met to thereby actuate the electric powered operation mode of the vehicle(s) 102 or the fuel powered operation mode of the vehicle(s) 102. Additionally, the number of occupants may be analyzed by the application 112 to primarily operate the vehicle(s) 102 in the electric powered operation mode or the fuel powered operation mode upon the enablement of the vehicle 102. For example, in one configuration, during initial operation of the vehicle 102, the engine 104 may be configured to charge the battery 106 and operate the vehicle(s) 102 within the fuel powered operation mode, when the number of occupants is determined to include the driver as a single occupant of the vehicle(s) 102. The battery 106 may further be utilized to provide electrical power to operate the vehicle(s) 102 within the electric powered operation mode when one or more non-driving occupants are determined to enter the vehicle(s) 102.

In one embodiment, the vehicle(s) 102 may include a display unit 212 that may be configured to provide one or more human machine interfaces to one or more occupants seated within the vehicle(s) 102. The display unit 212 may be configured as a single display screen or multiple display screens that may be disposed within one or more interior portions of the vehicle(s) 102. For example, the display unit 212 may be configured as a display screen that may be disposed within a center console of the vehicle(s) 102 and/or within a dashboard of the vehicle(s) 102. The processor 204 may utilize the display unit 212 to present one or more user interfaces associated with one or more vehicle systems (not shown) of the vehicle(s) 102 and/or one or more applications that may be executed by the processor 204.

In some embodiments, the processor 204 may utilize the display unit 212 to present one or more user interfaces of the power mode selection application 112. In one configuration, the power mode selection application 112 may present a vehicle dynamic threshold preference selection user interface that may allow the vehicle operator(s) (not shown) of the vehicle(s) 102 to change the speed threshold and/or the throttle position threshold to a user customized speed threshold and/or user customized throttle position threshold. In some circumstances, the user customized speed threshold and/or user customized throttle position threshold may be changed from a default speed threshold and/or a default throttle position threshold that may be preset by the application 112. The user customized speed threshold and/or the user customized throttle position threshold may be used by the application 112 to determine if one or more vehicle operational requirements are met to thereby actuate the fuel powered operation mode or the electric powered operation mode. This functionality may allow the vehicle operator(s) to have control over when the vehicle(s) 102 may be operated through the motor powered by the battery 106 or through the engine 104 based on the actuation of the electric powered operation mode or the fuel powered operation mode.

In some configurations, the power mode selection application 112 may present a lease payment rate interface that allows vehicle operator(s) to view an upcoming lease payment rate(s) of the vehicle(s) 102 based on the calculated lease payment rate(s) by the power mode selection application 112. As discussed, the application 112 may calculate the lease payment rate(s) that may take into account one or more discounts that may be provided to the lease payment rate(s) that may be based on a duration a time and/or distance traveled by the vehicle(s) 102 during the actuation of the electric powered operation mode of the vehicle(s) 102 based on one or more vehicle operational requirements being met. The lease payment rate(s) may also be based on a cost of energy at one or more geo-locations in which the vehicle(s) 102 is traveling that may be based on data provided by one or more utility providers through the utility computing infrastructure 114.

The calculated lease payment rate(s) and discounts may provide the vehicle operator(s) with an incentive to maximize a number of occupants of the vehicle(s) 102 and/or operate the vehicle(s) 102 in a particular manner to maximize operation of the vehicle(s) 102 in the electric powered operation mode. In some cases, ride sharing customers may also be presented with discounted ride sharing fees that may be based on discounted lease payment rates to thereby provide an incentive for greater ride sharing usage. Accordingly, the application 112 may promote the maximization of a duration of time and distance of travel of the vehicle(s) 102 within the electric powered operation mode to thereby maximize the number of ZEV credits for the OEM, minimize the lease payment rate(s) for the vehicle operator(s), and minimize the ride sharing fees.

In an exemplary embodiment, the communication unit 214 of the vehicle(s) 102 may provide software, firmware, and/or hardware to facilitate data input and output between the components of the vehicle computing device 202 and other components, networks and data sources. Further, the communication unit 214 may facilitate communication with external resources through a network 118 to allow the vehicle computing device 202 to communicate with one or more external systems, infrastructures, and/or components of the environment 100. The communication unit 214 may allow the vehicle computing device 202 to communicate data to the utility computing infrastructure 114 and receive data from the utility computing infrastructure 114.

In an exemplary embodiment, the utility computing infrastructure 114 may include one or more computing devices (not shown) that may communicate with the one or more utility providers. In some embodiments, the power mode selection application 112 may communicate with the one or more electric energy providers through the utility computing infrastructure 126 to determine an energy cost that may be charged by one or more utility providers during one or more points in time at one or more geo-locations in which the vehicle(s) 102 is traveling. The energy cost that may be communicated by one or more utility providers may be analyzed by the application 112 to partially determine the lease payment rate(s) that may be charged to the vehicle operator(s) to lease the vehicle(s) 102 through the OEM.

Figure 3:
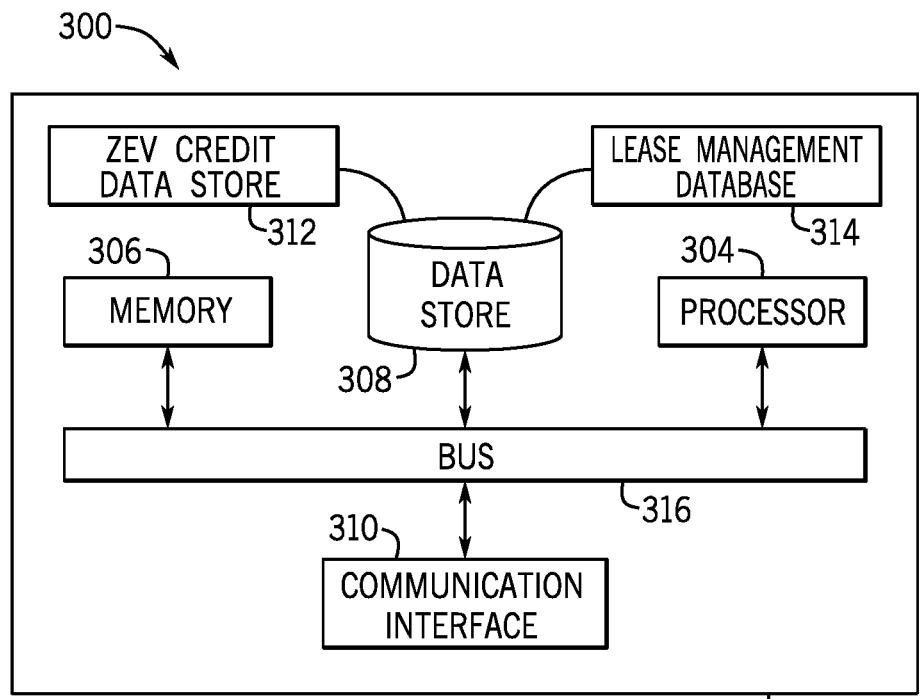
FIG. 3 is a schematic view of an illustrative OEM computing architecture of an OEM computing infrastructure according to an exemplary embodiment of the present disclosure.

In one or more embodiments, the communication unit 214 may allow the vehicle computing device 202 to communicate data to an OEM computing infrastructure 116 and receive data from the OEM computing infrastructure 116. The OEM computing infrastructure 116 may include a computing device (e.g., one or more servers) that may be operated and maintained by the OEM to send and receive data that may be processed, analyzed, and/or stored by the power mode selection application 112. With reference to FIG. 3, a schematic view of an illustrative OEM computing architecture 300 of the OEM computing infrastructure 116 is shown according to an exemplary embodiment of the present disclosure. In one configuration, the OEM computing architecture 300 includes a computing device 302 of the OEM computing infrastructure 116. The computing device 302 may include one or more physical servers that may be housed at one or more locations owned and/or maintained by the OEM. In additional configurations, the OEM computing infrastructure 116 may include one or more remote virtual servers that may be supported by a cloud architecture and maintained by the OEM.

In an exemplary embodiment, the computing device 302 of the OEM computing infrastructure 116 may include a processor 304, a memory 306, a data store 308, and a communication interface 310. The components of the architecture 300, including the computing device 302, may be operably connected for computer communication via a bus 316 and/or other wired and wireless technologies. The computing device 302 may include additional components and systems that are not shown.

In one embodiment, the communication interface 310 may provide software, firmware and/or hardware to facilitate data input and output between the components of the processor 304, the memory 306, and other components, networks and data sources associated with the OEM computing infrastructure 116. The communication interface 310 may be utilized to communicate with the communication unit 214 of the vehicle(s) 102 through the network 118 to exchange data that may be processed, analyzed, and/or stored by the power mode selection application 112.

The communication interface 310 may also be utilized to communicate with a respective communication device(s) (not shown) of the utility computing infrastructure 114 to exchange data that may be processed, analyzed, and/or stored by the power mode selection application 112. For example, the application 112 may utilize the communication interface 310 to determine the energy cost that may be charged by one or more utility providers during the one or more points in time at the particular geo-location(s) in which the vehicle(s) 102 is traveling. The energy cost that may be charged and communicated by one or more utility providers may be analyzed by the application 112 to partially determine the lease payment rate(s) that may be charged to the vehicle operator(s) to lease the vehicle(s) 102 through the OEM.

In one or more configurations, the data store 308 of the computing device 302 of the OEM computing infrastructure 116 may be configured to store a ZEV credit data store 312 and a lease management database 314. The ZEV credit data store 312 may include one or more records of accumulated ZEV credits that may be provided to the OEM by the power mode selection application 112, by a regulatory agency (e.g., government agency), and/or purchased by the OEM. In one embodiment, the ZEV credit data store 312 may be accessed by the power mode selection application 112 to update one or more records such that one or more ZEV credits that are determined to be earned by the application 112 may be added to the ZEV credit data store 312.

In one embodiment, the lease management database 314 may include a database that may be stored with respective records that are associated to each of the one or more of the vehicles 102. The records may include fields that may pertain to a particular period of time (e.g., day, week, month) and may be created with a standard lease payment rate(s) for each vehicle(s) 102. The standard lease payment rate(s) may include a default price rate(s) that may be determined by the OEM based on a pricing structure devised by the OEM and may be communicated to the processor 304 of the computing device 302 through the communication interface 310.

As discussed, the power mode selection application 112 may be configured to analyze the duration and/or the distance that the electric powered operation mode may be enabled for the vehicle(s) 102 for a particular period of time. The power mode selection application 112 may also be configured to determine a discount that may be applied to the standard lease payment rate(s) based on the actuation of the electric powered operation mode of the vehicle(s) 102 for one or more durations of time and/or one or more distances during a predetermined period of time. Upon determining the discount that is to be applied to the standard lease payment rate(s), the power mode selection application 112 may be configured to access the lease management database 314 and may update one or more receptive fields of one or more respective records to discount the standard lease payment rate(s) to a discounted lease payment rate(s) that takes into account the determined discount. Accordingly, the OEM may provide the discounted lease payment rate(s) to the respective vehicle operator(s) that is based on one or more vehicle operational requirements being met.

In one embodiment, the power mode selection application 112 may be configured to communicate with the GPS 206 of the vehicle(s) 102 to determine one or more geo-location(s) of the vehicle(s) 102 during the predetermined period of time of the lease payment rate(s). Upon determining one or more geo-locations, the application 112 may be configured to communicate with the utility computing infrastructure 114 to determine the energy cost that may be charged by one or more utility providers during the particular point(s) in time at the particular geo-location(s) in which the vehicle(s) 102 is traveling.

The power mode selection application 112 may thereby determine if the energy cost is above one or more predetermined energy cost thresholds (e.g., price per kWH) to further calculate if the discounted lease payment rate(s) is to be reduced. In many instances the energy cost may be determined by the utility providers based on the demand for energy at one or more particular points in time (e.g., morning, afternoon, evening, night). Accordingly, the discounted lease payment rate(s) may be further reduced based on the time of day that the vehicle(s) 102 is operating in the electric powered operation mode. The power mode selection application 112 accordingly calculates a utility based discounted lease payment rate(s) for one or more periods of time that may be charged by the OEM to the vehicle operator(s) that incentives the vehicle operator(s) to operate the vehicle(s) 102 to meet one or more vehicle operational requirements and operate the vehicle(s) 102 for a longer duration of time and/or for a longer distance in the electric powered operation mode. Upon calculating the utility based discounted lease payment rate(s), the application 112 may be configured to access the lease management database 314 and may update one or more receptive fields of one or more respective records to further reduce the discounted lease payment rate(s) to the utility based discounted lease payment rate(s) that takes into account the discounts and reductions calculated based on the actuation of the electric powered operation mode and the energy cost as provided by the utility provider(s).

II. The Vehicle Operation Power Mode Selection Application

The power mode selection application 112 and its components will now be described in more detail according to an exemplary embodiment and with continued reference to FIGS. 1-3. In one or more embodiments, the power mode selection application 112 may be executed by the vehicle computing device 202 of the vehicle(s) 102 and/or the computing device 302 of the OEM computing infrastructure 116. Data may be sent or received from the power mode selection application 112 to/from components of the vehicle(s) 102, the OEM computing infrastructure 116, the utility computing infrastructure 114, the EVSE 108, and/or the charging link 110.

Figure 4:
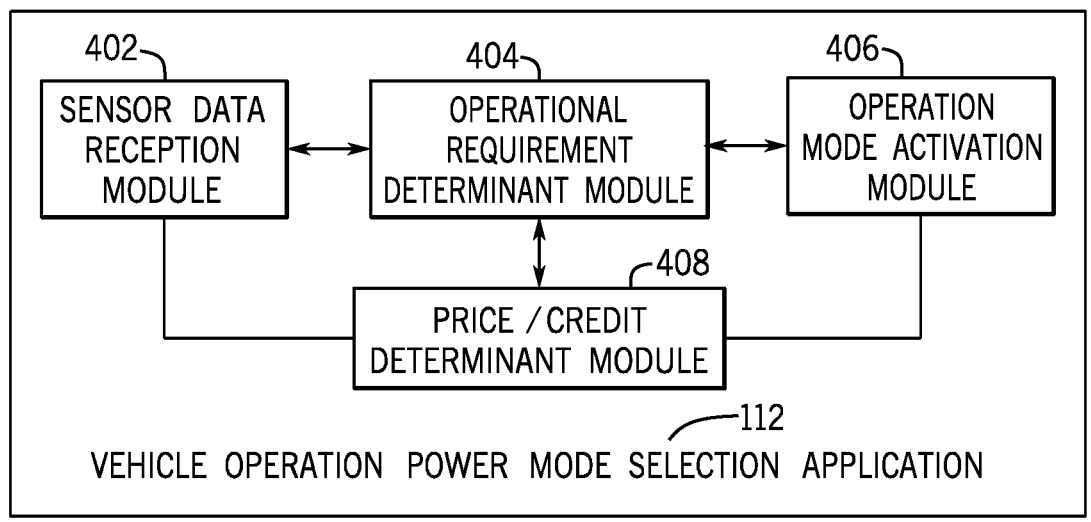
FIG. 4 is a schematic view of an illustrative example of a power mode selection application according to an exemplary embodiment of the present disclosure.

FIG. 4 is a schematic view of an illustrative example of the power mode selection application 112 according to an exemplary embodiment of the present disclosure. In an exemplary embodiment, the power mode selection application 112 may include a plurality of modules 402-408 that may be configured to execute one or more processes to determine if one or more operational requirements are met, to actuate the electric powered operation mode, to actuate the fuel powered operation mode, to electronically calculate one or more lease payment rate(s), and/or to determine a number of ZEV credits that may be provided to the OEM. The plurality of modules 402-408 may include a sensor data reception module 402, an operational requirement determinant module 404, an operation mode actuation module 406, and a price/credit determinant module 408. It is appreciated that the power mode selection application 112 may include one or more additional modules and/or sub-modules that are included in addition to or in lieu of the modules 402-408.

In one or more embodiments, the sensor data reception module 402 of the power mode selection application 112 may be configured to receive sensor data from the vehicle dynamic sensors 208 and/or the occupant sensors 210. The sensor data may include real-time vehicle dynamic data output by the vehicle dynamic sensors 208 that may indicate sensed real-time dynamic measures. The sensor data may additionally include occupant data output by the occupant sensors 210 that may indicate a sensed number of occupants that are detected within the vehicle(s) 102. Upon receiving the sensor data, the sensor data reception module 402 may be configured to analyze the sensor data to determine particular vehicle dynamics and vehicle occupancy information. In particular, the sensor data reception module 402 may analyze the vehicle dynamic data included within the sensor data to determine a real-time speed of the vehicle(s) 102 and/or a real-time throttle position of the throttle body of the engine 104 of the vehicle(s) 102 at a particular point in time. The sensor data reception module 402 may additionally or alternatively analyze the occupant data included within the sensor data to determine the number of occupants (e.g., drivers and non-driving passengers) that are seated within the vehicle(s) 102.

In one embodiment, upon determining the particular vehicle dynamics and vehicle occupancy information, the sensor data reception module 402 may be configured to communicate respective data to the operational requirement determinant module 404 of the power mode selection application 112. In one configuration, the operational requirement determinant module 404 may be configured to analyze the particular vehicle dynamics as communicated by the sensor data reception module 402 and may compare the particular vehicle dynamics against one or more vehicle operational requirements to determine if they are met. In particular, the operational requirement determinant module 404 may analyze the real-time speed of the vehicle(s) 102 and compare the real-time speed of the vehicle(s) 102 against the speed threshold (e.g., that may be pre-set by the application 112 or selected by the driver of the vehicle(s) 102) to determine if the real-time speed of the vehicle(s) 102 is below the speed threshold or meets and/or surpasses the speed threshold. Upon determining if the real-time speed of the vehicle(s) 102 is below the speed threshold or meets and/or surpasses the speed threshold, the operational requirement determinant module 404 may communicate data pertaining to the result of the comparison to the operation mode actuation module 406.

In another embodiment, the operational requirement determinant module 404 may analyze the real-time throttle position of the throttle body of the engine 104 of the vehicle(s) 102 and may compare the real-time throttle position of the throttle body of the engine 104 against the throttle position threshold (e.g., that may be pre-set by the application 112 or selected by the driver of the vehicle(s) 102) to determine if the real-time throttle position of the throttle body of the engine 104 of the vehicle(s) 102 is below the throttle position threshold or meets and/or surpasses the throttle position threshold. Upon comparing and determining if the real-time throttle position of the throttle body of the vehicle(s) 102 is below the throttle position threshold or meets and/or surpasses the throttle position threshold, the operational requirement determinant module 404 may communicate data pertaining to the result of the comparison to the operation mode actuation module 406.

In one or more embodiments, the operational requirement determinant module 404 may be configured to analyze the number of occupants seated within the vehicle(s) 102 as communicated by the sensor data reception module 402 and may compare the number of occupants against one or more vehicle operational requirements to determine if they are met. In particular, the operational requirement determinant module 404 may analyze the number of occupants seated within the vehicle(s) 102 and may compare the number of occupants against the occupant threshold to determine if the number of occupants seated within the vehicle(s) 102 meets or surpasses the occupant threshold or is below the occupant threshold. Upon comparing and determining if the number of occupants seated within the vehicle(s) 102 meets and/or surpasses the occupant threshold or are below the occupant threshold, the operational requirement determinant module 404 may communicate data pertaining to the result of the comparison to the operation mode actuation module 406.

In an exemplary embodiment, the operation mode actuation module 406 may be configured to selectively actuate the electric powered operation mode to allow the vehicle(s) 102 to be powered through the motor that utilizes electrical energy that is provided from the battery 106 of the vehicle(s) 102 and/or the fuel powered actuation mode of the vehicle(s) 102 to allow the vehicle(s) 102 to be powered by fuel energy that is provided to the engine 104 of the vehicle(s) 102. In one configuration, the operation mode actuation module 406 may be configured to actuate the electric powered operation mode of the vehicle(s) 102 when it is determined that the real-time speed of the vehicle(s) 102 is below the speed threshold (as determined by the operational requirement determinant module 404). Alternatively, the operation mode actuation module 406 may be configured to actuate the fuel powered operation mode of the vehicle(s) 102 when it is determined that the real-time speed meets and/or surpasses the speed threshold.

In another configuration, the operation mode actuation module 406 may be configured to actuate the electric powered operation mode of the vehicle(s) 102 when it is determined that the real-time throttle position of the throttle body of the vehicle(s) 102 is below the throttle position threshold (as determined by the operational requirement determinant module 404). Alternatively, the operation mode actuation module 406 may be configured to actuate the fuel powered operation mode of the vehicle(s) 102 when it is determined that the real-time throttle position of the throttle body of the vehicle(s) 102 meets and/or surpasses the throttle position threshold. For example, this determination may take place if the vehicle 102 is driven above a certain predetermined speed at which the engine 104 of the vehicle(s) 102 may be utilized to partially or fully power the vehicle(s) 102.

In one or more embodiments, the operation mode actuation module 406 may be configured to actuate the electric powered operation mode of the vehicle(s) 102 when it is determined that the number of occupants seated within the vehicle(s) 102 meet or surpass the occupant threshold (as determined by the operational requirement determinant module 404). Alternatively, the operation mode actuation module 406 may be configured to actuate the fuel powered operation mode of the vehicle(s) 102 when it is determined that the number of occupants seated within the vehicle(s) 102 are below the occupant threshold.

In one embodiment, the operation mode actuation module 406 may be configured to communicate with the processor 204 of the vehicle computing device 202 to actuate the electric powered operation mode and/or the fuel powered operation mode. In particular, the operation mode actuation module 406 may communicate data pertaining to the actuation of the electric powered operation mode and/or the fuel powered operation mode to the processor 204. The processor 204 may be configured to operably control the motor operably connected to the battery 106 to provide electric power to operate the vehicle(s) 102 during actuation of the electric powered operation mode. The processor 204 may also be configured to operably control the engine 104 of the vehicle(s) 102 to operate the vehicle(s) 102 based on fuel energy during actuation of the fuel powered operation mode.

In one or more embodiments, after the vehicle(s) 102 has been enabled and prior to the vehicle(s) 102 being disabled (e.g., during each trip of the vehicle(s) 102), the operation mode actuation module 406 may be configured to determine a duration of time in which the electric powered operation mode of the vehicle(s) 102 has been actuated and the vehicle(s) 102 has been operating using electric power. Additionally or alternatively, the operation mode actuation module 406 may be configured to determine a distance (e.g., number of miles/kilometers) that the vehicle(s) 102 has as the electric powered operation mode of the vehicle(s) 102 has been actuated and the vehicle(s) 102 has been operating using electric power provided by the battery 106. The operation mode actuation module 406 may be configured to communicate the duration of actuation of the electric powered operation mode and/or the distance traveled during actuation of the electric powered operation mode to the price/credit determinant module 408 of the power mode selection application 112.

In an exemplary embodiment, the price/credit determinant module 408 may be configured to analyze the duration of actuation of the electric powered operation mode and/or the distance traveled during actuation of the electric powered operation mode of the vehicle(s) 102 that may be determined at one or more points in time. The price/credit determinant module 408 may be configured to aggregate the duration of actuation of the electric powered operation mode and/or the distance traveled during actuation of the electric powered operation mode of each of the one or more vehicles 102 into an aggregated duration of the electric powered operation mode and/or an aggregated distance traveling during actuation of the electric powered operation mode for a period of time (e.g., one month, six months, one year)

In one embodiment, the price/credit determinant module 408 may be configured to utilize the communication interface 310 to communicate with the regulatory agency to determine a number of ZEV credits that may be provided by the agency based on the aggregated duration of the electric powered operation mode and/or an aggregated distance traveled during actuation of the electric powered operation mode for the period of time. In other words, the price/credit determinant module 408 may be configured to communicate with the regulatory agency to determine the number of ZEV credits that may be earned by the OEM based on the aggregated usage of electrical energy to power the vehicle(s) 102 manufactured, sold/leased, managed by the OEM, and/or particular vehicles 102 that may be dispatched by the OEM for short-term leasing and/or ride sharing programs. The price/credit determinant module 408 may thereby determine the number of ZEV credits that may be earned by the OEM for the period of time. In one configuration, the ZEV credit data store 312 may be accessed by the price/credit determinant module 408 to update one or more records such that the determined earned ZEV credits may be added to the ZEV credit data store 312 based on the actuation of the electric powered operation mode of the vehicle(s) 102 during the predetermined period of time.

In one or more embodiments, the price/credit determinant module 408 may also be configured to analyze the duration of actuation of the electric powered operation mode and/or the distance traveled during actuation of the electric powered operation mode of the vehicle(s) 102 (e.g., of each respective vehicle) that may be determined during a predetermined period of time. The price/credit determinant module 408 may be configured to determine a discount that may be applied to the standard lease payment rate(s) based on the actuation of the electric powered operation mode of the vehicle(s) 102 for one or more durations of time and/or one or more distances. Upon determining the discount that is to be applied to the standard lease payment rate(s), the price/credit determinant module 408 may be configured to access the lease management database 314 and may update one or more receptive fields of one or more respective records to discount the standard lease payment rate(s) to a discounted lease payment rate(s) that takes into account the determined discount. Accordingly, the OEM may provide the discounted lease payment rate(s) to the vehicle operators that is based on one or more vehicle operational requirements being met.

In one embodiment, the price/credit determinant module 408 may be configured to communicate with the GPS 206 of the vehicle(s) 102 to determine one or more geo-location(s) of the vehicle(s) 102 during the predetermined period of time of the lease payment rate(s). Upon determining one or more geo-locations, the price/credit determinant module 408 may be configured to communicate with the utility computing infrastructure 114 to determine the energy cost that may be provided by one or more utility providers during the particular point(s) in time at the particular geo-location(s) in which the vehicle(s) 102 is traveling.

The price/credit determinant module 408 may thereby determine if the energy cost that may be provided by one or more utility providers during the particular point(s) in time at the particular geo-location(s) is above one or more predetermined energy cost thresholds to further calculate an amount the discounted lease payment rate(s) is to be further reduced. In many instances the energy cost may be determined by the utility providers based on the demand for energy at one or more particular points in time (e.g., morning, afternoon, evening, night). Accordingly, the discounted lease payment rate(s) may be further reduced by an amount based on the time of day that the vehicle(s) 102 is operating in the electric powered operation mode. The price/credit determinant module 408 accordingly calculates a utility based discounted lease payment rate(s) for one or more periods of time that may be charged by the OEM to the vehicle operator(s) that incentives the vehicle operator(s) to operate the vehicle(s) 102 to meet one or more vehicle operational requirements and operate the vehicle(s) 102 for a longer duration of time and/or for a longer distance in the electric powered operation mode. Upon calculating the utility based discounted lease payment rate(s), the price/credit determinant module 408 may be configured to access the lease management database 314 and may update one or more receptive fields of one or more respective records to further reduce the discounted lease payment rate(s) to the utility based discounted lease payment rate(s) that takes into account the discounts and reductions calculated based on the actuation of the electric powered operation mode and the energy cost as provided by the utility provider(s).

In one embodiment, upon updating the discounted lease payment rate(s) and/or the utility based discounted lease payment rate(s) within the lease management database 314, the price/credit determinant module 408 may utilize the communication interface 310 to communicate respective data to the vehicle computing device 202 of the vehicle(s) 102 through communication with the communication unit 214. Upon receipt of the data pertaining to the discounted lease payment rate(s) and/or the utility based discounted lease payment rate(s), the processor 204 may be configured to operably control the display unit 212 to present the lease payment rate interface that allows vehicle operator(s) of the vehicle(s) 102 to determine the lease payment price rate(s) (e.g., upcoming lease payment rate) based on the calculated discounted lease payment rate(s) and/or utility based discounted lease payment rate(s) by the power mode selection application 112.

In another embodiment, the price/credit determinant module 408 may be configured to calculate discounted ride sharing fees that may be charged to ride sharing customers based on discounted lease payment rates to thereby provide an incentive for greater ride sharing usage. In certain circumstances, the discounted lease payment rates may be additionally or alternatively based on the geo-location of the vehicle(s) 102 that are utilized to pick-up the ride sharing customers, an intended destination of the ride sharing customers, the duration that the vehicle(s) 102 is operated within the electric powered mode during the utilization of the vehicle(s) 102 by the ride sharing customers, and/or the distance that the vehicle(s) 102 is operated within the electric powered mode during the utilization of the vehicle(s) 102 by the ride sharing customers.

III. Methods Executed by the Vehicle Operation Power Mode Selection Application

Figure 5:
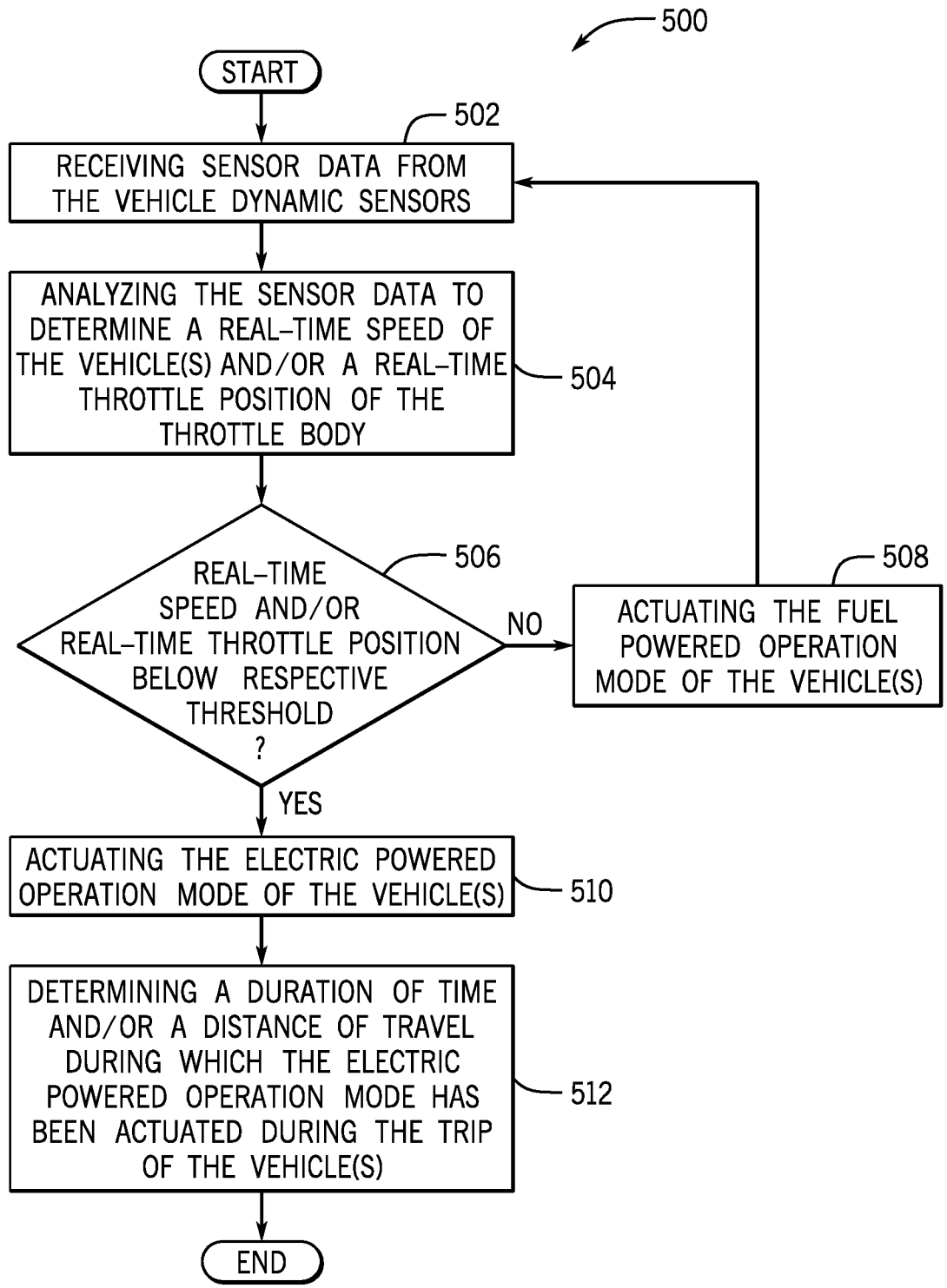
FIG. 5 is a process flow diagram of a method for actuating an electric powered operation mode or a fuel powered operation mode based on vehicle dynamics of a vehicle(s) according to an exemplary embodiment of the present disclosure.

FIG. 5 is a process flow diagram of a method 500 for actuating the electric powered operation mode or the fuel powered operation mode based on vehicle dynamics of the vehicle(s) 102 according to an exemplary embodiment of the present disclosure. The method 500 of FIG. 5 will be described with reference to the components of FIGS. 1-4, though it is to be appreciated that the method 500 may be used with additional and/or alternative system components. The method 500 may begin at block 502, wherein the method 500 may include receiving sensor data from the vehicle dynamic sensors.

In one or more embodiments, the sensor data reception module 402 of the power mode selection application 112 may be configured to communicate with the vehicle dynamic sensors 208 and/or the processor 204 to receive sensor data from the vehicle dynamic sensors 208. As discussed above, the sensor data may include real-time vehicle dynamic data based on real-time dynamic measurements sensed and output by the vehicle dynamic sensors 208. For example, the sensor data may be include a real-time speed of the vehicle(s) 102 that may be further analyzed by the application 112.

The method 500 may proceed to block 504, wherein the method 500 may include analyzing the sensor data to determine a real-time speed of the vehicle(s) 102 and/or a real-time throttle position of the throttle body of the engine 104 of the vehicle(s) 102. In an exemplary embodiment, upon receiving the sensor data, the sensor data reception module 402 may be configured to analyze the sensor data to determine particular vehicle dynamics. In particular, the sensor data reception module 402 may analyze the vehicle dynamic data included within the sensor data to determine a real-time speed of the vehicle(s) 102 and/or a real-time throttle position of the throttle body of the engine 104 of the vehicle(s) 102 at a particular point in time. In one embodiment, upon determining the real-time speed of the vehicle(s) 102 and/or the real-time throttle position of the throttle body, the sensor data reception module 402 may be configured to communicate respective data to the operational requirement determinant module 404 of the power mode selection application 112.

The method 500 may proceed to block 506, wherein the method 500 may include determining if the real-time speed and/or the real-time throttle position are below respective thresholds. In one embodiment, the operational requirement determinant module 404 may be configured to analyze the real-time speed of the vehicle(s) 102 and may compare the real-time speed of the vehicle(s) 102 against the speed threshold (e.g., that may be pre-set by the application 112 or selected by the driver of the vehicle(s) 102) to determine if the real-time speed of the vehicle(s) 102 is below the speed threshold or meets or meets and/or surpasses the speed threshold. Upon comparing and determining if the real-time speed of the vehicle(s) 102 is below the speed threshold or meets and/or surpasses the speed threshold, the operational requirement determinant module 404 may communicate data pertaining to the result of the comparison to the operation mode actuation module 406.

In another embodiment, the operational requirement determinant module 404 may analyze the real-time throttle position of the throttle body of the engine 104 of the vehicle(s) 102 and may compare the real-time throttle position of the throttle body of the engine 104 against the throttle position threshold (e.g., that may be pre-set by the application 112 or selected by the driver of the vehicle(s) 102) to determine if the real-time throttle position of the throttle body of the engine 104 of the vehicle(s) 102 is below the throttle position threshold or meets and/or surpasses the throttle position threshold. This determination may take place if the vehicle 102 is driven above a certain predetermined speed at which the engine 104 of the vehicle(s) 102 may be utilized to partially or fully power the vehicle(s) 102. Upon comparing and determining if the real-time throttle position of the throttle body of the vehicle(s) 102 is below the throttle position threshold or meets and/or surpasses the throttle position threshold, the operational requirement determinant module 404 may communicate data pertaining to the result of the comparison to the operation mode actuation module 406.

If it is determined that the real-time speed and/or the real-time throttle position are not below the respective thresholds (at block 506), the method 500 may proceed to block 508, wherein the method 500 may include actuating the fuel powered operation mode of the vehicle(s) 102. In one embodiment, based on the real-time speed meeting and/or surpassing the speed threshold, the operation mode actuation module 406 may selectively actuate the fuel powered operation mode of the vehicle(s) 102 to enable the vehicle(s) 102 to be operated based on motive power supplied by the engine 104 of the vehicle(s) 102. In one configuration, the operation mode actuation module 406 may communicate with the processor 204 of the vehicle computing device 202 to control the vehicle(s) 102 to be powered based on the fuel powered operation mode. Accordingly, the processor 204 may be configured to operably control the engine 104 of the vehicle(s) 102 to operate the vehicle(s) 102 based on fuel energy during actuation of the fuel powered operation mode.

As an illustrative example, if the operational requirement determinant module 404 determines that the real-time speed of the vehicle is 60 miles per hour and the speed threshold is '40 miles per hour,' the operational requirement determinant module 404 may determine that the operational requirement of the real-time speed being below the speed threshold is not met. The operation mode actuation module 406 may accordingly be configured to communicate with the processor 204 of the vehicle computing device 202 to control the vehicle(s) 102 to be powered based on the fuel powered operation mode. This may influence the lease payment rate(s) for the vehicle operator as the higher real-time speed may not indicate high energy efficient driving of the vehicle(s) 102.

As shown, upon actuation of the fuel powered operation mode, the power mode selection application 112 may continue receiving sensor data from the vehicle dynamic sensors and analyzing the sensor data to determine if the real-time speed and/or real-time throttle position fall below the respective thresholds to further determine if the vehicle(s) 102 should continue to be operated within the fuel powered operation mode or the mode of operation should be changed to actuate the electric powered operation mode. In some configurations, the application 112 may continually receive sensor data and analyze the sensor data to determine the mode of operation of the vehicle(s) 102 until the vehicle(s) 102 is fully disabled (e.g., all of the ignition modes of the vehicle 102 are turned off).

If it is determined that the real-time speed and/or real-time throttle position are below the respective thresholds (at block 506), the method 500 may proceed to block 510, wherein the method 500 may include actuating the electric powered operation mode of the vehicle(s) 102. In one embodiment, based on determining that the real-time speed and/or the real-time throttle position is below the respective speed threshold or throttle position threshold, the operation mode actuation module 406 may selectively actuate the electric powered operation mode of the vehicle(s) 102 to enable the vehicle(s) 102 to be operated based on electrical power supplied to the motor by the battery 106 of the vehicle(s) 102. In one configuration, the operation mode actuation module 406 may communicate with the processor 204 of the vehicle computing device 202 to control the vehicle(s) 102 to be powered based on the electric powered operation mode. Accordingly, the processor 204 may be configured to operably control the battery 106 of the vehicle(s) 102 to provide electrical power to the motor to operate the vehicle(s) 102 based on electrical energy during actuation of the electric powered operation mode.

As an illustrative example, if the operational requirement determinant module 404 determines that the real-time speed of the vehicle(s) 102 is 35 miles per hour and the speed threshold is '40 miles per hour,' the operational requirement determinant module 404 may determine that the operational requirement of the real-time speed of the vehicle(s) 102 being below the speed threshold is met. The operation mode actuation module 406 may accordingly be configured to communicate with the processor 204 of the vehicle computing device 202 to control the vehicle(s) 102 to be powered based on the electric powered operation mode. This may influence the lease payment rate(s) for the vehicle operator as the lower real-time speed may indicate high energy efficient driving of the vehicle(s) 102.

In another embodiment, the operation mode actuation module 406 may communicate with the processor 204 to determine if the battery 106 has a sufficient state of charge to electrically power the motor of the vehicle(s) 102 to operate the vehicle(s) 102 for a predetermined duration and/or distance. The processor 204 may communicate the state of charge of the battery 106 to the operation mode actuation module 406 to be analyzed to determine if the state of charge is at a sufficient level to electrically power the motor of the vehicle(s) 102 for the predetermined duration, predetermined distance, and/or to reach an expected destination. Accordingly, if it is determined that the state of charge of the battery 106 is sufficient, the operation mode actuation module 406 may selectively actuate the electric powered operation mode of the vehicle(s) 102 to enable the vehicle(s) 102 to be operated based on electrical power supplied to the motor by the battery 106 of the vehicle(s) 102.

In one configuration, if it is determined that the state of charge of the battery 106 is insufficient, the operation mode actuation module 406 may present a user interface through the display unit 212 to present a message to the driver of the vehicle(s) 102 to recharge the battery to a sufficient level and may continue to control the vehicle(s) 102 to be powered in the fuel powered operation mode until the battery 106 is recharged. In another configuration, it is determined that the state of charge of the battery 106 is insufficient, the operation mode actuation module 406 may communicate with the processor 204 to control the engine 104 of the vehicle(s) 102 to provide charging power to the battery 106 during operation of the engine 104 such that when the engine 104 provides motive power to operate the vehicle(s) 102, the battery 106 may be provided with an electrical charge to recharge the battery 106.

The operation mode actuation module 406 may continually communicate with the processor 204 to determine when the state of charge of the battery 106 reaches a sufficient level to electrically power the motor of the vehicle(s) 102 for the predetermined duration, predetermined distance, and/or to reach an expected destination. Upon determining that the state of change is at a sufficient level, the operation mode actuation module 406 may communicate with the operational requirement determinant module 404 to determine if the real-time speed and/or the real-time throttle position are below the respective thresholds (at block 506) to thereby actuate one of the operation modes of the vehicle(s) 102.

Upon actuating the electric powered operation mode of the vehicle(s) 102 (at block 510), the method 500 may proceed to block 512, wherein the method 500 may include determining a duration of time and/or a distance of travel during which the electric powered operation mode has been actuated during the trip of the vehicle(s) 102. In one or more embodiments, after the vehicle(s) 102 has been enabled and prior to the vehicle(s) 102 being disabled (e.g., during each trip of the vehicle(s) 102), the operation mode actuation module 406 may be configured to determine a duration of time in which the electric powered operation mode of the vehicle(s) 102 has been actuated and the vehicle(s) 102 has been operating using electric power. Additionally or alternatively, the operation mode actuation module 406 may be configured to determine a distance that the vehicle(s) 102 has traveled as the electric powered operation mode of the vehicle(s) 102 has been actuated and the vehicle(s) 102 has been operating using electric power. The operation mode actuation module 406 may be configured to communicate the duration of actuation of the electric powered operation mode and/or the distance traveled during actuation of the electric powered operation mode to the price/credit determinant module 408 of the power mode selection application 112.

It is to be appreciated that upon actuation of the electric powered operation mode, the power mode selection application 112 may continue receiving sensor data from the vehicle dynamic sensors and analyzing the sensor data to determine if the real-time speed and/or real-time throttle position continue to fall below the respective thresholds to further determine if the vehicle(s) 102 should continue to be operated within the electric powered operation mode or the mode of operation should be changed to actuate the fuel powered operation mode. In some configurations, the application 112 may continually receive sensor data and analyze the sensor data to determine the mode of operation of the vehicle(s) 102 until the vehicle(s) 102 is fully disabled.

Figure 6:
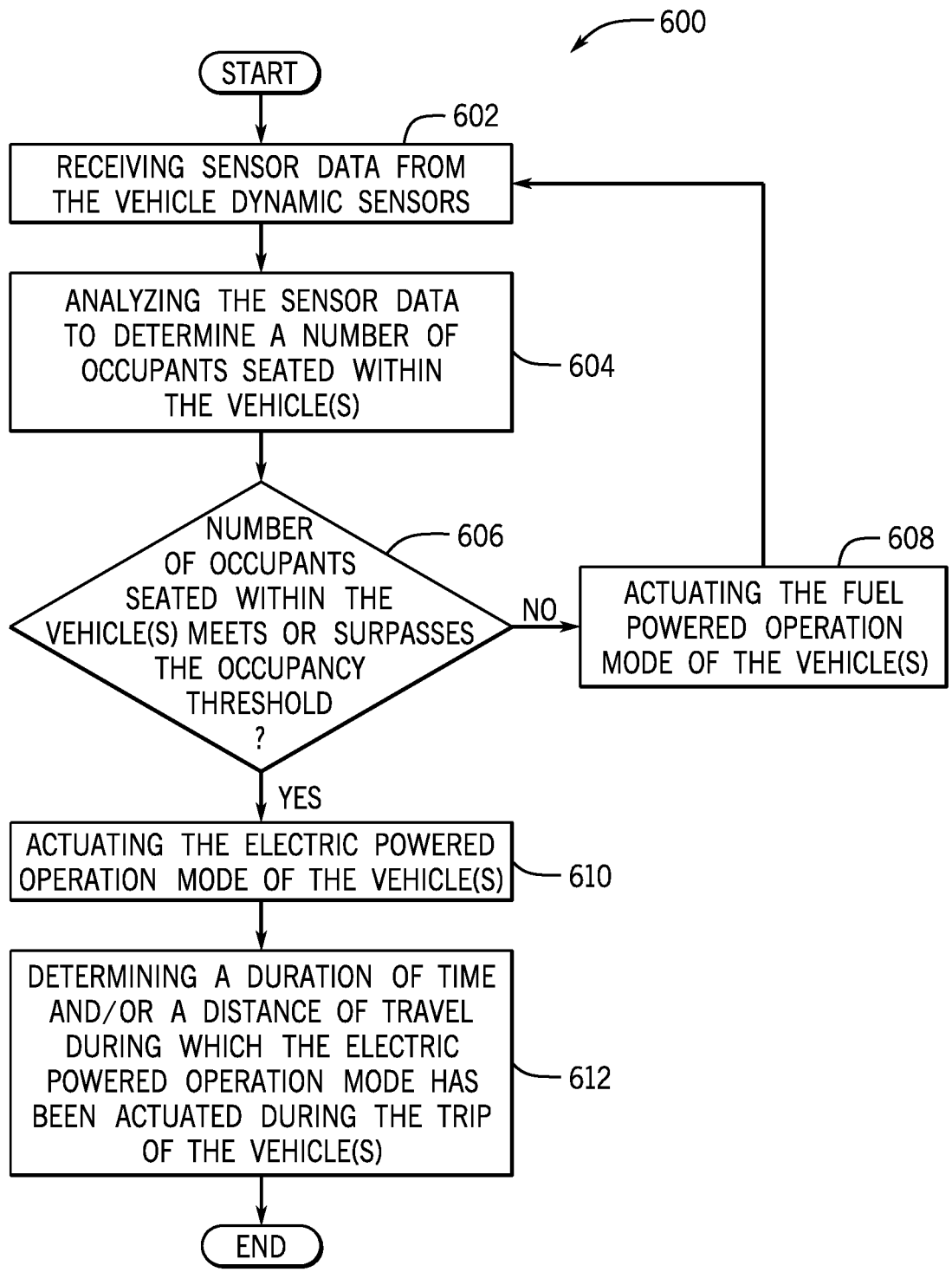
FIG. 6 is a process flow diagram of a method for actuating the electric powered operation mode or the fuel powered operation mode based on a number of occupants seated within the vehicle(s) according to an exemplary embodiment of the present disclosure.

FIG. 6 is a process flow diagram of a method 600 for actuating the electric powered operation mode or the fuel powered operation mode based on a number of occupants seated within the vehicle(s) 102 according to an exemplary embodiment of the present disclosure. The method 600 of FIG. 6 will be described with reference to the components of FIGS. 1-4, though it is to be appreciated that the method 600 may be used with additional and/or alternative system components. The method 600 may begin at block 602, wherein the method 600 may include receiving sensor data from the vehicle dynamic sensors 208.

In one or more embodiments, the sensor data reception module 402 of the power mode selection application 112 may be configured to communicate with the occupant sensors 210 and/or the processor 204 to receive sensor data from the occupant sensors 210. As discussed above, the sensor data may include occupant data based on a sensed number of occupants within the vehicle(s) 102 and output by the occupant sensors 210. For example, the sensor data may be include a number of occupants that are currently sensed as being seated within the seats of the vehicle(s) 102 that may be further analyzed by the application 112.

The method 600 may proceed to block 604, wherein the method 600 may include analyzing the sensor data to determine a number of occupants seated within the vehicle(s) 102. In one embodiment, upon receiving the sensor data, the sensor data reception module 402 may be configured to analyze the sensor data to determine vehicle occupancy information. In particular, the sensor data reception module 402 may analyze occupant data included within the sensor data to determine a number of occupants (e.g., drivers and non-driving passengers) that are seated within the vehicle(s) 102. In one embodiment, upon determining the vehicle occupancy information, the sensor data reception module 402 may be configured to communicate respective data to the operational requirement determinant module 404 of the power mode selection application 112.

The method 600 may proceed to block 606, wherein the method 600 may include determining if the number of occupants seated within the vehicle(s) 102 meets or surpasses the occupancy threshold. In one or more embodiments, the operational requirement determinant module 404 may be configured to analyze the number of occupants seated within the vehicle(s) 102 as communicated by the sensor data reception module 402 and may compare the number of occupants against one or more vehicle operational requirements to determine if they are met. In particular, the operational requirement determinant module 404 may analyze the number of occupants seated within the vehicle(s) 102 and may compare the number of occupants against the occupant threshold to determine if the number of occupants seated within the vehicle(s) 102 meets or surpasses the occupant threshold or is below the occupant threshold. Upon comparing and determining if the number of occupants seated within the vehicle(s) 102 meets and/or surpasses the occupant threshold or are below the occupant threshold, the operational requirement determinant module 404 may communicate data pertaining to the result of the comparison to the operation mode actuation module 406.

If it is determined that the number of occupants seated within the vehicle(s) 102 is below the occupancy threshold (at block 606), the method 600 may proceed to block 608, wherein the method 600 may include actuating the fuel powered operation mode of the vehicle(s) 102. In one embodiment, based on determining that the number of occupants seated within the vehicle(s) 102 is below the occupant threshold, the operation mode actuation module 406 may selectively actuate the fuel powered operation mode of the vehicle(s) 102 to enable the vehicle(s) 102 to be operated based on motive power supplied by the engine 104 of the vehicle(s) 102. In one configuration, the operation mode actuation module 406 may communicate with the processor 204 of the vehicle computing device 202 to control the vehicle(s) 102 to be powered based on the fuel powered operation mode. Accordingly, the processor 204 may be configured to operably control the engine 104 of the vehicle(s) 102 to operate the vehicle(s) 102 based on fuel energy during actuation of the fuel powered operation mode.

As an illustrative example, if the operational requirement determinant module 404 determines that there is only one occupant driver within the vehicle(s) 102 and the occupant threshold is "two occupants," the operational requirement determinant module 404 may determine that the operational requirement of the number of occupants meeting or surpassing the occupant threshold is not met. The operation mode actuation module 406 may accordingly be configured to communicate with the processor 204 of the vehicle computing device 202 to control the vehicle(s) 102 to be powered based on the fuel powered operation mode. This may influence the lease payment rate(s) for the vehicle operator as the vehicle(s) 102 is not be presently occupied with numerous occupants which may indicate ride sharing.

In one embodiment, the application 112 may communicate with the GPS 206 to determine the geo-location(s) of the vehicle(s) 102. Upon determining the geo-location(s), the application 112 may utilize the geo-location(s) to promote ride sharing by providing the one or more interfaces to the vehicle operator(s) that participate in ride sharing programs to allow various ride sharing customers within a predetermined vicinity of the geo-location(s) of the vehicle(s) 102 to utilize the vehicle(s) 102. This functionality may thereby increase the number of occupants to meet or surpass the occupant threshold to maximize a duration and/or a distance of actuation of the electric powered operation mode of the vehicle(s) 102.

In another embodiment, the application 112 may provide one or more interfaces that may be used by the vehicle operator(s) to allow ride sharing customers that are located within a certain predetermined vicinity of one another to utilize the vehicle(s) 102 based on its determined geo-location(s) as provided by the GPS 206 to reach their intended destinations. This functionality may also increase the number of occupants within the vehicle(s) 102 to meet or surpass the occupant threshold to maximize a duration and/or a distance of actuation of the electric powered operation mode of the vehicle(s) 102.

In one configuration, upon actuation of the fuel powered operation mode, the power mode selection application 112 may continue receiving sensor data from the vehicle dynamic sensors and analyzing the sensor data to determine if the number of occupants seated within the vehicle(s) 102 meets or exceeds the occupant threshold to further determine if the vehicle(s) 102 should continue to be operated within the fuel powered operation mode or the mode of operation should be changed to actuate the electric powered operation mode. In some configurations, the application 112 may continually receive sensor data and analyze the sensor data to determine the mode of operation of the vehicle(s) 102 until the vehicle(s) 102 is fully disabled.

If it is determined that the number of occupants seated within the vehicle(s) 102 meets or surpasses the occupancy threshold (at block 606), the method 600 may proceed to block 610, wherein the method 600 may include actuating the electric powered operation mode of the vehicle(s) 102. In one embodiment, based on the number of sensed occupants seated in the vehicle(s) 102 meeting and/or surpassing the occupant threshold, the operation mode actuation module 406 may selectively actuate the electric powered operation mode of the vehicle(s) 102 to enable the vehicle(s) 102 to be operated based on electrical power supplied to the motor by the battery 106 of the vehicle(s) 102. In one configuration, the operation mode actuation module 406 may communicate with the processor 204 of the vehicle computing device 202 to control the vehicle(s) 102 to be powered based on the electric powered operation mode. Accordingly, the processor 204 may be configured to operably control the battery 106 of the vehicle(s) 102 to provide electrical power to the motor to operate the vehicle(s) 102 based on electrical energy during actuation of the electric powered operation mode.

As an illustrative example, if the operational requirement determinant module 404 determines that there is more than one occupant (e.g., a driver and a non-driving passenger) seated within the vehicle(s) 102 and the occupant threshold is "two occupants," the operational requirement determinant module 404 may determine that the operational requirement of the number of occupants meeting or surpassing the occupant threshold is met. The operation mode actuation module 406 may accordingly be configured to communicate with the processor 204 of the vehicle computing device 202 to control the vehicle(s) 102 to be powered based on the electric powered operation mode. This may influence the lease payment rate(s) for the vehicle operator as the vehicle(s) 102 is presently occupied with numerous occupants which may indicate ride sharing.

In another embodiment, the operation mode actuation module 406 may communicate with the processor 204 to determine if the battery 106 has a sufficient state of charge to electrically power the motor of the vehicle(s) 102 to operate the vehicle(s) 102 for a predetermined duration and/or distance. The processor 204 may communicate the state of charge of the battery 106 to the operation mode actuation module 406 to be analyzed to determine if the state of charge is at a sufficient level to electrically power the motor of the vehicle(s) 102 for the predetermined duration, predetermined distance, and/or to reach an expected destination. Accordingly, if it is determined that the state of charge of the battery 106 is sufficient, the operation mode actuation module 406 may selectively actuate the electric powered operation mode of the vehicle(s) 102 to enable the vehicle(s) 102 to be operated based on electrical power supplied to the motor by the battery 106 of the vehicle(s) 102.

In one configuration, if it is determined that the state of charge of the battery 106 is insufficient, the operation mode actuation module 406 may present a user interface through the display unit 212 to present a message to the driver of the vehicle(s) 102 to recharge the battery to a sufficient level and may continue to control the vehicle(s) 102 to be powered in the fuel powered operation mode until the battery 106 is recharged. In another configuration, it is determined that the state of charge of the battery 106 is insufficient, the operation mode actuation module 406 may communicate with the processor 204 to control the engine 104 of the vehicle(s) 102 to provide charging power to the battery 106 during operation of the engine 104 such that when the engine 104 provides motive power to operate the vehicle(s) 102, the battery 106 may be provided with an electrical charge to recharge the battery 106. The operation mode actuation module 406 may continually communicate with the processor 204 to determine when the state of charge of the battery 106 is at a charge is at a sufficient level to electrically power the motor of the vehicle(s) 102 for the predetermined duration, predetermined distance, and/or to reach an expected destination. Upon determining that the state of change is at a sufficient level, the operation mode actuation module 406 may communicate with the operational requirement determinant module 404 to determine if the number of occupants still meets or surpasses the occupancy threshold (at block 606) to thereby actuate one of the operation modes of the vehicle(s) 102.

Upon actuating the electric powered operation mode of the vehicle(s) 102 (at block 610), the method 600 may proceed to block 612, wherein the method 600 may include determining a duration of time and/or a distance of travel during which the electric powered operation mode has been actuated during the trip of the vehicle(s) 102. In one or more embodiments, after the vehicle(s) 102 has been enabled and prior to the vehicle(s) 102 being disabled (e.g., during each trip of the vehicle(s) 102), the operation mode actuation module 406 may be configured to determine a duration of time in which the electric powered operation mode of the vehicle(s) 102 has been actuated and the vehicle(s) 102 has been operating using electric power. Additionally or alternatively, the operation mode actuation module 406 may be configured to determine a distance that the vehicle(s) 102 has traveled as the electric powered operation mode of the vehicle(s) 102 has been actuated and the vehicle(s) 102 has been operating using electric power. The operation mode actuation module 406 may be configured to communicate the duration of actuation of the electric powered operation mode and/or the distance traveled during actuation of the electric powered operation mode to the price/credit determinant module 408 of the power mode selection application 112.

It is to be appreciated that upon actuation of the electric powered operation mode, the power mode selection application 112 may continue receiving sensor data from the vehicle dynamic sensors and analyzing the sensor data to determine if the number of occupants continue to meet or surpass the occupant threshold to further determine if the vehicle(s) 102 should continue to be operated within the electric powered operation mode or the mode of operation should be changed to actuate the fuel powered operation mode. In some configurations, the application 112 may continually receive sensor data and analyze the sensor data to determine the mode of operation of the vehicle(s) 102 until the vehicle(s) 102 is fully disabled. It is also to be appreciated that in some embodiments, the power mode selection application 112 may execute the method 500 and the method 600 in conjunction with one another to thereby actuate the electric power mode of the vehicle(s) 102 when the speed and/or the throttle position is below respective thresholds and when the number of occupants seated within the vehicle(s) 102 are determined to be above the occupant threshold.

Figure 7:
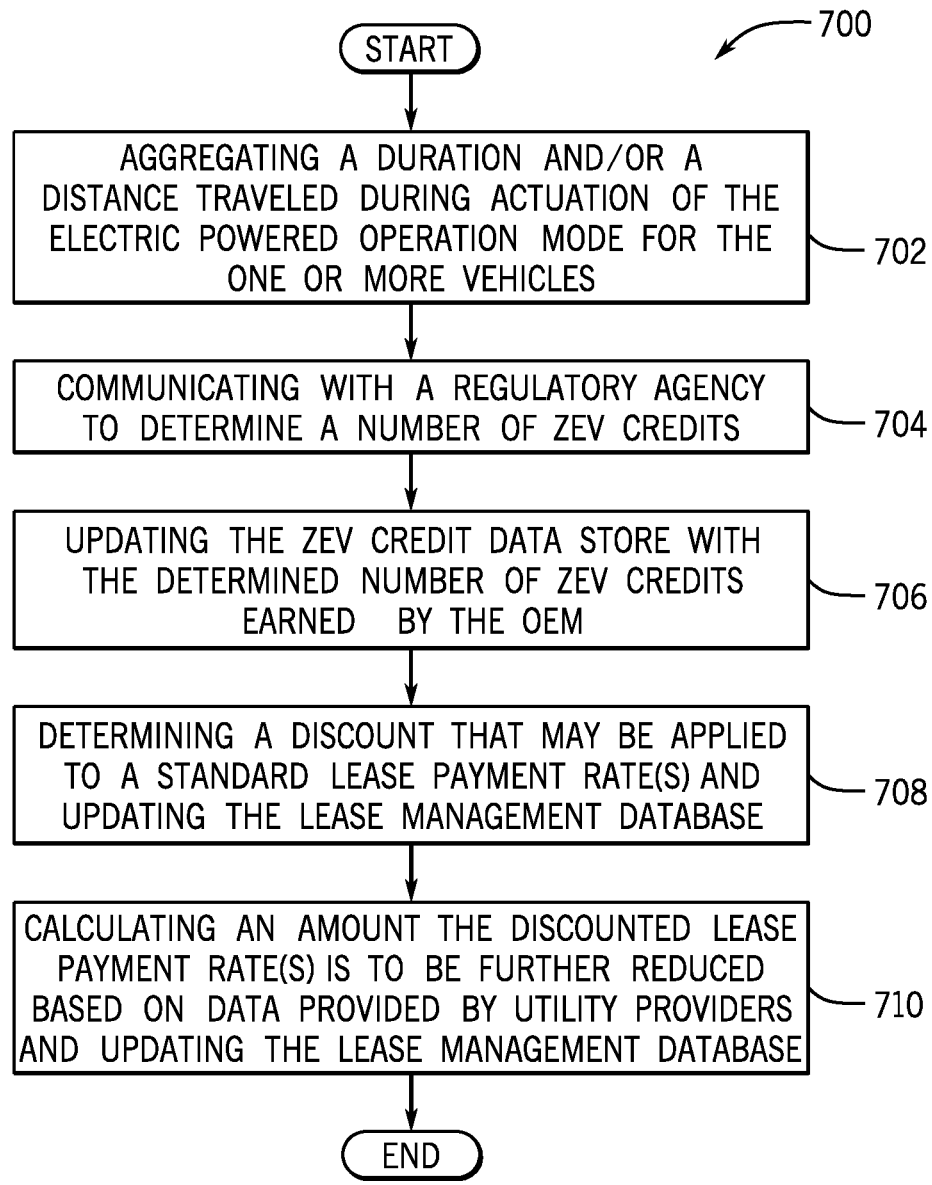
FIG. 7 is a process flow diagram of a method for determining a number of ZEV credits and a lease payment rate(s) according to an exemplary embodiment of the present disclosure.

FIG. 7 is a process flow diagram of a method 700 for determining a number of ZEV credits and a lease payment rate(s) according to an exemplary embodiment of the present disclosure. The method 700 of FIG. 7 will be described with reference to the components of FIGS. 1-4, though it is to be appreciated that the method 700 may be used with additional and/or alternative system components. The method 700 may begin at block 702, wherein the method 700 may include aggregating a duration and/or a distance traveled during actuation of the electric powered operation mode for the one or more vehicles 102.

In an exemplary embodiment, the operation mode actuation module 406 may be configured to communicate the duration of actuation of the electric powered operation mode and/or the distance traveled during actuation of the electric powered operation mode (as determined at block 512 of FIG. 5 and/or block 612 of FIG. 6) to the price/credit determinant module 408 of the power mode selection application 112. In an exemplary embodiment, the price/credit determinant module 408 may be configured to analyze the duration of actuation of the electric powered operation mode and/or the distance traveled during actuation of the electric powered operation mode of the vehicle(s) 102 that may be determined at one or more points in time. The price/credit determinant module 408 may be configured to aggregate the duration of actuation of the electric powered operation mode and/or the distance traveled during actuation of the electric powered operation mode of each of the vehicle(s) 102 into an aggregated duration of the electric powered operation mode and/or an aggregated distance traveling during actuation of the electric powered operation mode for a period of time (e.g., one month, six months, one year), In other words, the price/credit determinant module 408 may be configured to aggregate the duration of actuation of the electric powered operation mode and/or the distance traveled during actuation of the electric powered operation mode of the PHEVs and/or the BEVs that have been manufactured by the OEM.

The method 700 may proceed to block 704, wherein the method 700 may include communicating with a regulatory agency to determine a number of ZEV credits. In one embodiment, the price/credit determinant module 408 may be configured to utilize the communication interface 310 to communicate with the regulatory agency (e.g., government agency) to determine a number of ZEV credits that may be provided by the agency based on the aggregated duration of the electric powered operation mode and/or an aggregated distance traveling during actuation of the electric powered operation mode for the period of time. Stated differently, the price/credit determinant module 408 may be configured to communicate with the regulatory agency to determine the number of ZEV credits that may be earned by the OEM based on the aggregated usage of electrical energy to power the PHEVs and/or BEVs manufactured, sold/leased, and/or managed by the OEM. The price/credit determinant module 408 may thereby determine the number of ZEV credits that may be earned by the OEM for the period of time.

The method 700 may proceed to block 706, wherein the method 700 may include updating the ZEV credit data store 312 with the determined number of ZEV credits earned by the OEM. In one or more embodiments, the price/credit determinant module 408 may access the ZEV credit data store 312 stored on the data store 308 of the computing device 302 to update one or more records to add the earned ZEV credits to the ZEV credit data store 312 based on the actuation of the electric powered operation mode of the vehicle(s) 102 during the predetermined period of time. The OEM may thereby determine the number of ZEV credits assigned by the regulatory agency based on the vehicle(s) 102 (PHEVs manufactured by the OEMs) being operated to meet one or more vehicle operation requirements.

The method 700 may proceed to block 708, wherein the method 700 may include determining a discount that may be applied to a standard lease payment rate(s) and updating the lease management database 314. In one or more embodiments, the price/credit determinant module 408 may be configured to analyze the duration of actuation of the electric powered operation mode and/or the distance traveled during actuation of the electric powered operation mode of the vehicle(s) 102 that may be determined during a predetermined period of time. The price/credit determinant module 408 may be configured to determine a discount that may be applied to the standard lease payment rate(s) based on the actuation of the electric powered operation mode of the vehicle(s) 102 for one or more durations of time and/or one or more distances. The discount may be proportionate to the one or more durations of time and/or one or more distances that the vehicle(s) 102 is operated within the electric powered operation mode. Accordingly, the greater the duration(s) of time and/or distance(s) traveled within the electric powered operation mode, the greater the discount that may be determined by the price/credit determinant module 408 to apply to the standard lease payment rate(s).

Upon determining the discount that is to be applied to the standard lease payment rate(s), the price/credit determinant module 408 may be configured to access the lease management database 314 and may update one or more receptive fields of one or more respective records to discount the standard lease payment rate(s) to a discounted lease payment rate(s) that takes into account the determined discount. Accordingly, the OEM may provide the discounted lease payment rate(s) to the vehicle operator(s) that is based on one or more vehicle operational requirements being met.

The method 700 may proceed to block 710, wherein the method 700 may include calculating an amount the discounted lease payment rate(s) is to be further reduced based on data provided by utility providers and updating the lease management database 314. In one embodiment, the price/credit determinant module 408 may be configured to communicate with the GPS 206 of the vehicle(s) 102 to determine one or more geo-location(s) of the vehicle(s) 102 during the predetermined period of time of the lease payment rate(s). Upon determining one or more geo-locations, the price/credit determinant module 408 may be configured to communicate with the utility computing infrastructure 114 to determine the energy cost that may be provided by one or more utility providers during the particular point(s) in time at the particular geo-location(s) in which the vehicle(s) 102 is traveling.

The price/credit determinant module 408 may thereby determine if the energy cost is above one or more predetermined energy cost thresholds to further calculate if the an amount that the discounted lease payment rate(s) is to be further reduced based on data provided by utility providers. Accordingly, the discounted lease payment rate(s) may be further reduced by a particular monetary amount based on the time of day that the vehicle(s) 102 is operating in the electric powered operation mode. The price/credit determinant module 408 may thereby calculate a utility based discounted lease payment rate(s) for one or more periods of time that may be charged by the OEM to the vehicle operator(s) that incentives the vehicle operator(s) to operate the vehicle(s) 102 to meet one or more vehicle operational requirements.

In other words, the vehicle operator(s) may be incentivized to operate the vehicle(s) 102 for a longer duration of time and/or for a longer distance in the electric powered operation mode. Upon calculating the utility based discounted lease payment rate(s), the price/credit determinant module 408 may be configured to access the lease management database 314 and may update one or more receptive fields of one or more respective records to further reduce the discounted lease payment rate(s) to the utility based discounted lease payment rate(s) that takes into account the discounts and reductions calculated to apply to the standard lease payment rate(s) based on the actuation of the electric powered operation mode and the energy cost as provided by the utility provider(s).

As discussed above, upon updating the discounted lease payment rate(s) and/or the utility based discounted lease payment rate(s) within the lease management database 314, the price/credit determinant module 408 may utilize the communication interface 310 to communicate respective data to the vehicle computing device 202 of the vehicle(s) 102 through communication with the communication unit 214. Upon receipt of the data pertaining to the discounted lease payment rate(s) and/or the utility based discounted lease payment rate(s), the processor 204 may be configured to operably control the display unit 212 to present the lease payment rate interface that allows vehicle operator(s) of the vehicle(s) 102 to determine the lease payment rate(s) (e.g., upcoming lease payment rate) based on the calculated discounted lease payment rate(s) and/or the utility based discounted lease payment rate(s) by the power mode selection application 112. The real-time determination of the discounted lease payment rate(s) may provide an incentive to the vehicle operator(s) to operate the vehicle(s) 102 in a manner that may allow one or more of the vehicle operational requirements to be met for longer durations of time and/or for a longer distances of travel to thereby lower the cost to lease the vehicle(s) 102 from the OEM. Accordingly, the power mode selection application 112 may promote a higher utilization of electricity to fully operate the vehicle(s) 102 to thereby reduce the lease rate(s) for the vehicle operator(s) while increasing the number of ZEV credits for the OEM.

Figure 8:
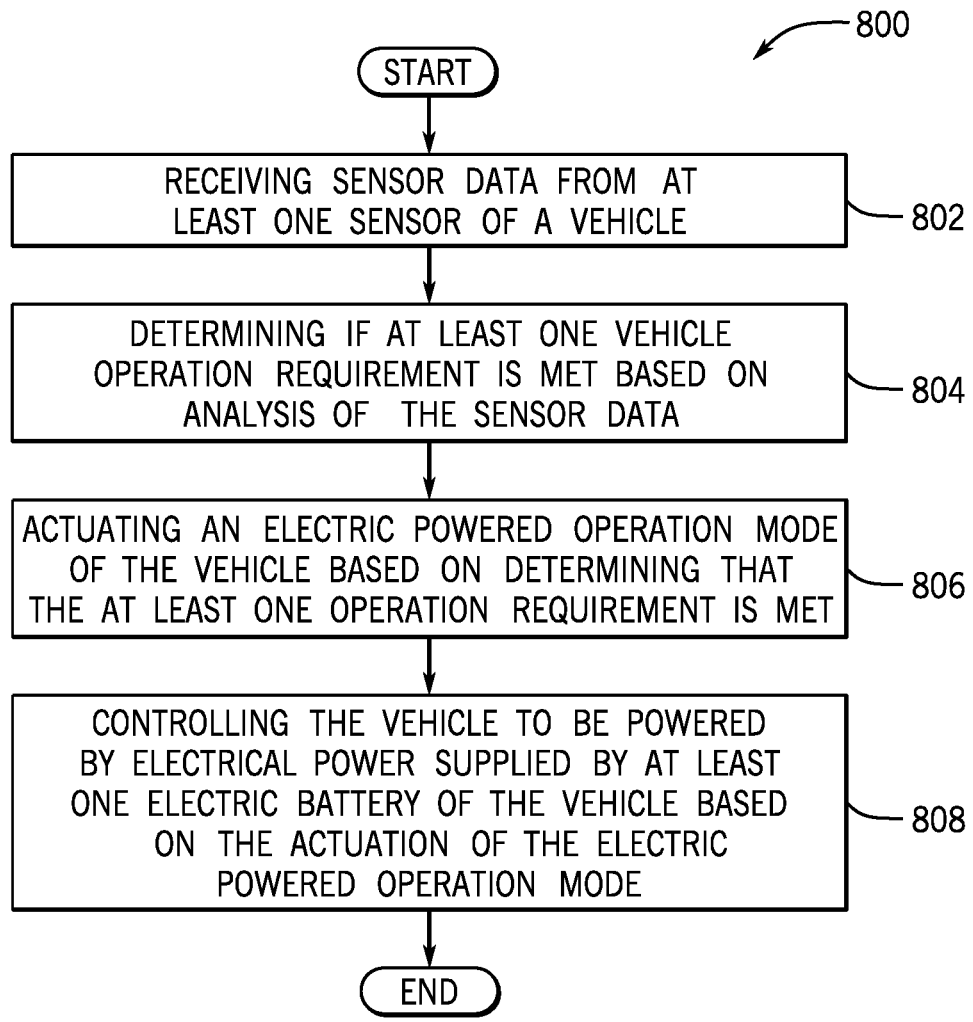
FIG. 8 is a process flow diagram of a method for actuating a vehicle operation power mode according to an exemplary embodiment of the present disclosure.

FIG. 8 is a process flow diagram of a method 800 for actuating a vehicle operation power mode according to an exemplary embodiment of the present disclosure. The method 800 of FIG. 8 will be described with reference to the components of FIGS. 1-4, though it is to be appreciated that the method 800 may be used with additional and/or alternative system components. The method 800 may begin at block 802, wherein the method 800 may include receiving sensor data from at least one sensor of a vehicle 102.

The method 800 may proceed to block 804, wherein method 800 may include determining if at least one vehicle operation requirement is met based on analysis of the sensor data. The method 800 may proceed to block 806, wherein the method 800 may include actuating an electric powered operation mode of the vehicle 102 based on determining that the at least one operation requirement is met. The method 800 may include controlling the vehicle 102 to be powered by electrical power supplied by an electric battery 106 of the vehicle 102 based on the actuation of the electric powered operation mode.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for actuating a vehicle operation power mode, comprising:
   receiving sensor data from at least one sensor of a vehicle;
   determining if at least one vehicle operation requirement is met based on analysis of the sensor data;
   actuating an electric powered operation mode of the vehicle based on determining that the at least one operation requirement is met;
   actuating a fuel powered operation mode upon determining that the at least one operation requirement is not met, wherein an electric battery of the vehicle is configured to be charged by a fuel powered engine of the vehicle; and
   controlling the vehicle to be powered by electrical power supplied by the electric battery or by fuel power supplied by the fuel powered engine of the vehicle based on the actuation of the electric powered operation mode or the fuel powered operation mode, wherein the electric battery is configured to be charged by the fuel powered engine of the vehicle until a state of change of the electric battery is determined to be at a sufficient level to operate the vehicle through the electric powered operation mode for at least one of: a predetermined duration, a predetermined distance, and to reach an expected destination.

2. The computer-implemented method of claim 1, wherein receiving the sensor data from the at least one sensor of the vehicle includes receiving occupant sensing data that pertains to a number of occupants that are seated within the vehicle.

3. The computer-implemented method of claim 2, wherein determining if the at least one vehicle operation requirement is met includes comparing the sensed number of occupants that are seated within the vehicle against an occupant threshold to determine if the sensed number of occupants meet or surpass the occupant threshold, wherein the occupant threshold is based on a model of the vehicle.

4. The computer-implemented method of claim 3, wherein actuating the electric powered operation mode of the vehicle includes modifying a mode of operation of the vehicle from the fuel powered operation mode to the electric powered operation mode upon determining that the sensed number of occupants that are seated within the vehicle meet or surpass the occupant threshold.

5. The computer-implemented method of claim 1, further including managing dispatch of the vehicle based on a geo-location of the vehicle and a state a charge of the electric battery of the vehicle to allow the vehicle to be operated for a maximum duration of time and a maximum distance of travel in the electric powered operation mode.

6. The computer-implemented method of claim 1, further including determining a lease payment rate that is to be applied to lease the vehicle, wherein the lease payment rate is based on at least one of: a duration of time, or a distance of travel during which the electric powered operation mode has been actuated during at least one trip of the vehicle.

7. The computer-implemented method of claim 6, further including calculating a discounted ride sharing fee that is charged to at least one ride sharing customer based on the lease payment rate and a geo-location of the vehicle.

8. The computer-implemented method of claim 1, further including determining a number of zero-emission vehicle program credits that are provided to a manufacturer of the vehicle, wherein the number of zero-emission vehicle program credits are based on at least one: an aggregated duration of time or an aggregated distance of travel during which the electric powered operation mode has been actuated for plug in hybrid vehicles manufactured by the manufacturer.

9. A system for actuating a vehicle operation power mode, comprising:
   a memory storing instructions when executed by a processor cause the processor to:
   receive sensor data from at least one sensor of a vehicle;
   determine if at least one vehicle operation requirement is met based on analysis of the sensor data;
   actuate an electric powered operation mode of the vehicle based on determining that the at least one operation requirement is met;
   actuate a fuel powered operation mode upon determining that the at least one operation requirement is not met, wherein an electric battery of the vehicle is configured to be charged by a fuel powered engine of the vehicle; and
   control the vehicle to be powered by electrical power supplied by the electric battery or by fuel power supplied by the fuel powered engine of the vehicle based on the actuation of the electric powered operation mode or the fuel powered operation mode, wherein the electric battery is configured to be charged by the fuel powered engine of the vehicle until a state of change of the electric battery is determined to be at a sufficient level to operate the vehicle through the electric powered operation mode for at least one of: a predetermined duration, a predetermined distance, and to reach an expected destination.

10. The system of claim 9, wherein receiving the sensor data from the at least one sensor of the vehicle includes receiving occupant sensing data that pertains to a number of occupants that are seated within the vehicle.

11. The system of claim 10, wherein determining if the at least one vehicle operation requirement is met includes comparing the sensed number of occupants that are seated within the vehicle against an occupant threshold to determine if the sensed number of occupants meet or surpass the occupant threshold, wherein the occupant threshold is based on a model of the vehicle.

12. The system of claim 11, wherein actuating the electric powered operation mode of the vehicle includes modifying a mode of operation of the vehicle from the fuel powered operation mode to the electric powered operation mode upon determining that the sensed number of occupants that are seated within the vehicle meet or surpass the occupant threshold.

13. The system of claim 9, further including managing dispatch of the vehicle based on a geo-location of the vehicle and a state a charge of the electric battery of the vehicle to allow the vehicle to be operated for a maximum duration of time and a maximum distance of travel in the electric powered operation mode.

14. The system of claim 9, further including determining a lease payment rate that is to be applied to lease the vehicle, wherein the lease payment rate is based on at least one of: a duration of time, or a distance of travel during which the electric powered operation mode has been actuated during at least one trip of the vehicle.

15. The system of claim 14, further including calculating a discounted ride sharing fee that is charged to at least one ride sharing customer based on the lease payment rate and a geo-location of the vehicle.

16. The system of claim 9, further including determining a number of zero-emission vehicle program credits that are provided to a manufacturer of the vehicle, wherein the number of zero-emission vehicle program credits are based on at least one: an aggregated duration of time or an aggregated distance of travel during which the electric powered operation mode has been actuated for plug in hybrid vehicles manufactured by the manufacturer.

17. A non-transitory computer readable storage medium storing instructions that when executed by a computer, which includes a processor perform a method, the method comprising:
receiving sensor data from at least one sensor of a vehicle;
determining if at least one vehicle operation requirement is met based on analysis of the sensor data;
actuating an electric powered operation mode of the vehicle based on determining that the at least one operation requirement is met;
actuating a fuel powered operation mode upon determining that the at least one operation requirement is not met, wherein an electric battery of the vehicle is configured to be charged by a fuel powered engine of the vehicle; and
controlling the vehicle to be powered by electrical power supplied by the electric battery or by fuel power supplied by the fuel powered engine of the vehicle based on the actuation of the electric powered operation mode or the fuel powered operation mode, wherein the electric battery is configured to be charged by the fuel powered engine of the vehicle until a state of change of the electric battery is determined to be at a sufficient level to operate the vehicle through the electric powered operation mode for at least one of: a predetermined duration, a predetermined distance, and to reach an expected destination.

18. The non-transitory computer readable storage medium of claim 17, further including determining a number of zero-emission vehicle program credits that are provided to a manufacturer of the vehicle, wherein the number of zero-emission vehicle program credits are based on at least one: an aggregated duration of time or an aggregated distance of travel during which the electric powered operation mode has been actuated for plug in hybrid vehicles manufactured by the manufacturer.

* * * * *